US012652570B2

(12) United States Patent
Fehrenbach et al.

(10) Patent No.: US 12,652,570 B2
(45) Date of Patent: Jun. 9, 2026

(54) ENHANCED L1/L2 TRIGGERED MOBILITY PROCEDURES

(71) Applicant: Fraunhofer-Gesellschaft zur Förderung der angewandten Forschung e.V., Munich (DE)

(72) Inventors: Thomas Fehrenbach, Berlin (DE); Baris Göktepe, Berlin (DE); Thomas Wirth, Berlin (DE); Thomas Schierl, Berlin (DE); Cornelius Hellge, Berlin (DE); Thomas Wiegand, Berlin (DE); Alvaro López Raventós, Berlin (DE); Buket Torun, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 19/382,649

(22) Filed: Nov. 7, 2025

(65) Prior Publication Data

US 2026/0136226 A1 May 14, 2026

(30) Foreign Application Priority Data

Nov. 8, 2024 (EP) ..................................... 24211933

(51) Int. Cl.
*H04L 12/26* (2006.01)
*H04B 7/06* (2006.01)
*H04W 24/10* (2009.01)

(52) U.S. Cl.
CPC .......... *H04W 24/10* (2013.01); *H04B 7/0626* (2013.01); *H04B 7/06952* (2023.05)

(58) Field of Classification Search
CPC ........ H04W 36/24; H04L 47/10; H04L 43/50; H04L 12/2697; H04L 43/0852; H04L 43/00; H04B 7/0626; H04B 7/06952
See application file for complete search history.

(56) References Cited

U.S. PATENT DOCUMENTS

2021/0068000 A1* 3/2021 Tao ........................ H04W 24/10
2023/0388871 A1* 11/2023 Guo .................. H04W 36/0069
2024/0276266 A1* 8/2024 Cheng ................... H04W 24/10

FOREIGN PATENT DOCUMENTS

GB 2626373 A 7/2024

OTHER PUBLICATIONS

Korean language office action dated Feb. 17, 2026, issued in application No. KR 10-2025-0167779 (English language translation, pp. 1-6 of attachment).

(Continued)

*Primary Examiner* — Phuongchau Ba Nguyen
(74) *Attorney, Agent, or Firm* — McClure, Qualey & Rodack, LLP

(57) ABSTRACT

A user device, UE, is described which monitors a plurality of beams for a predefined time period for one or more predefined event criteria and determines a meeting of the one or more predefined event criteria using a Layer1 measurement. The one or more of the predefined event criteria include one or more of the following: LTM2, LTM3, LTM4, LTM5. Responsive to meeting one or more of the predefined event criteria, the UE provides a measurement report. The UE sends the measurement report to a network entity in case a leaving condition is met, the measurement report having a CRI and/or a SSBRI.

18 Claims, 8 Drawing Sheets

(56)

References Cited

OTHER PUBLICATIONS

Nokia; "Measurement related enhancements for LTM;" 3GPP TSG RAN WG1 #118bis; Oct. 2024; pp. 1-13.
Partial Search Report dated Feb. 5, 2026, issued in application No. PCT/EP2025/082374.
Qualcomm Incorporated; "L1 event-triggered measurement reporting for LTM;" 3GPP TSG-RAN WG2 #128; Nov. 2024; pp. 1-7.
Fujitsu; "Measurement enhancements for LTM;" 3GPP TSG-RAN WG2 Meeting #126; May 2024; pp. 1-8.
Qualcomm Incorporated; "Measurement enhancements for LTM;" 3GPP TSG-RAN WG2 #127-bis; Oct. 2024; pp. 1-6.
3GPP Standard; Technical Specification; "3rd Generation Partnership Project; Technical Specification Group Radio Access Network; NR; Radio Resource Control (RRC) protocol specification (Release 18);" Sep. 2024; pp. 1-1694.

ETSI TS 138 331 V18.1.0; "5G; NR; Radio Resource Control (RRC); Protocol specification (3GPP TS 38.331 version 18.1.0 Release 18);" May 2024; pp. 1-1624.
ETSI TS 138 212 V18.2.0; "5G; NR; Multiplexing and channel coding (3GPP TS 38.212 version 18.2.0 Release 18);" May 2024; pp. 1-293.
3GPP TS 38.331 V18.6.0; "3rd Generation Partnership Project; Technical Specification Group Radio Access Network; NR; Radio Resource Control (RRC) protocol specification;" Jun. 2025; pp. 1-1718.
3GPP TS 38.321 V18.6.0; "3rd Generation Partnership Project; Technical Specification Group Radio Access Network; NR; Medium Access Control (MAC) protocol specification (Release 18);" Jun. 2025; pp. 1-340.
VIVO; "Introduction of NR mobility enhancements Phase 4 in MAC;" 3GPP TSG-RAN WG2 Meeting #131; Aug. 2025; pp. 1-69.

* cited by examiner

```
LTM-Config-new ::= SEQUENCE {
ltm-ReferenceConfiguration-r18        SetupRelease {ReferenceConfiguration-r18}                    OPTIONAL,  -- Need M
ltm-CandidateToReleaseList-r18        SEQUENCE (SIZE (1..maxNrofLTM-Configs-r18)) OF LTM-CandidateId-r18 OPTIONAL, -- Need N
ltm-CandidateToAddModList-r18         SEQUENCE (SIZE (1..maxNrofLTM-Configs-r18)) OF LTM-Candidate-new  OPTIONAL, -- Need N
ltm-ServingCellNoResetID-r18          INTEGER (1..maxNrofLTM-Configs-plus1-r18)                    OPTIONAL, -- Need N
ltm-CSI-ResourceConfigToAddModList-r18 SEQUENCE (SIZE (1..maxNrofLTM-CSI-ResourceConfigurations-r18)) OF LTM-CSI-ResourceConfig-new
                                                                                  OPTIONAL, -- Need N
ltm-CSI-ResourceConfigToReleaseList-r18 SEQUENCE {SIZE (1..maxNrofLTM-CSI-ResourceConfigurations-r18)) OF LTM-CSI-ResourceConfigId-r18
                                                                                  OPTIONAL, -- Need N
attemptLTM-Switch-r18                 ENUMERATED {true}                           OPTIONAL, -- Cond LTM-MCG
ltm-ServingCellUE-MeasuredTA-ID-r18   INTEGER (1..maxNrofLTM-Configs-plus1-r18)                    OPTIONAL, -- Need N

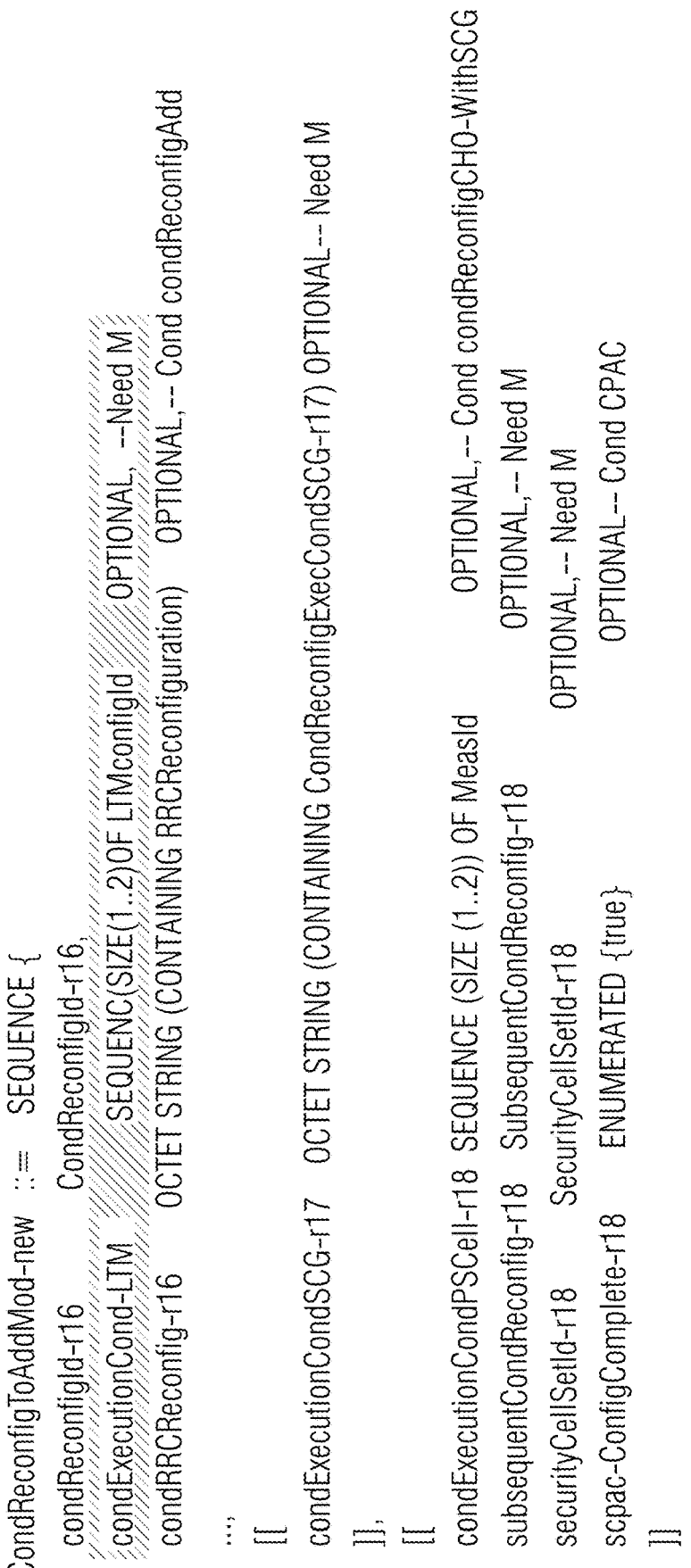

```
CondReconfigToAddMod-new  ::=  SEQUENCE {
  condReconfigId-r16          CondReconfigId-r16,
  condExecutionCond-LTM       SEQUENC(SIZE(1..2)OF LTMconfigId     OPTIONAL, --Need M
  condRRCReconfig-r16         OCTET STRING (CONTAINING RRCReconfiguration)    OPTIONAL,-- Cond condReconfigAdd
  ...,
  [[
  condExecutionCondSCG-r17    OCTET STRING (CONTAINING CondReconfigExecCondSCG-r17) OPTIONAL-- Need M
  ]],
  [[
  condExecutionCondPSCell-r18  SEQUENCE (SIZE (1..2)) OF MeasId                  OPTIONAL,-- Cond condReconfigCHO-WithSCG
  subsequentCondReconfig-r18   SubsequentCondReconfig-r18                        OPTIONAL,-- Need M
  securityCellSetId-r18        SecurityCellSetId-r18                 OPTIONAL,-- Need M
  scpac-ConfigComplete-r18     ENUMERATED {true}                    OPTIONAL-- Cond CPAC
  ]]
```

Fig. 7

ENHANCED L1/L2 TRIGGERED MOBILITY PROCEDURES

CROSS-REFERENCE TO RELATED APPLICATIONS

This application claims priority from European Application No. 24211933.7, which was filed on Nov. 8, 2024, and is incorporated herein by reference in its entirety.

TECHNICAL FIELD

The present invention relates to the field of wireless communication systems or networks, more specifically to measurements of reference signals by a user equipment or user device, UE. Embodiments of the present invention concern enhancements of enhanced L1/L2 Triggered Mobility, LTM, procedures.

BACKGROUND OF THE INVENTION

FIG. 1(A) and FIG. 1(B) illustrate a schematic representation of an example of a terrestrial wireless network 100 including, as is shown in FIG. 1(A), the core network, CN, 102 and one or more radio access networks $RAN_1$, $RAN_2$, . . . $RAN_N$. FIG. 1(B) is a schematic representation of an example of a radio access network $RAN_n$ that may include one or more base stations $gNB_1$ to $gNB_5$, each serving a specific area surrounding the base station schematically represented by respective cells 1061 to 1065. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards, e.g., a base station in a 6G network. The BS may also comprise of integrated access and backhaul, IAB, nodes, e.g., an IAB Donor and/or IAB Node, consisting of a central unit, CU, as well as of a distributed unit, DU, and/or containing IAB-MTs including IAB mobile termination, MT. The term base station may refer to an access point, AP, in any of the WiFi standards, e.g., belonging to the IEEE 802.11-family. A user may be a stationary device or a mobile device. The wireless communication system may also be accessed by mobile or stationary IoT devices which connect to a base station or to a user. The mobile or stationary devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(B) shows an exemplary view of five cells, however, the $RAN_n$ may include more or less such cells, and $RAN_n$ may also include only one base station. FIG. 1(B) shows two users $UE_1$ and $UE_2$, also referred to as user device or user equipment, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(B) shows two further devices $110_1$ and $110_2$ in cell $106_4$, like IoT devices, which may be stationary or mobile devices. The device $110_1$ accesses the wireless communication system via the base station $gNB_4$ to receive and transmit data as schematically represented by arrow $112_1$. The device $110_2$ accesses the wireless communication system via the user $UE_3$ as is schematically represented by arrow $112_2$. The respective base station $gNB_1$ to $gNB_5$ may be connected to the core network 102, e.g., via the S1 interface, via respective backhaul links $114_1$ to $114_5$, which are schematically represented in FIG. 1(B) by the arrows pointing to "core". The core network 102 may be connected to one or more external networks. The external network may be the Internet, or a private network, such as an Intranet or any other type of campus networks, e.g., a private WiFi communication system or a 4G or 5G mobile communication system. Further, some or all of the respective base station $gNB_1$ to $gNB_5$ may be connected, e.g., via the S1 or X2 interface or the XN interface in NR, with each other via respective backhaul links 1161 to 1165, which are schematically represented in FIG. 1(B) by the arrows pointing to "gNBs". A sidelink channel allows direct communication between UEs, also referred to as device-to-device, D2D, communication. The sidelink interface in 3GPP is named PC5. Note, that the term user equipment, UE, or user device may also refer to a station, STA, as used in any of the WiFi standards, e.g., belonging to the IEEE 802.11-family.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, and the physical sidelink broadcast channel, PSBCH, carrying for example a master information block, MIB, and one or more system information blocks, SIBs, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. The sidelink interface may support a 2-stage SCI which refers to a first control region containing some parts of the SCI, also referred to as the $1^{st}$-stage SCI, and optionally, a second control region which contains a second part of control information, also referred to as the $2^{nd}$-stage SCI.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g., 1 ms. Each subframe may include one or more slots of 12 or 14 OFDM symbols depending on the cyclic prefix, CP, length. A frame may also have a smaller number of OFDM symbols, e.g., when utilizing shortened transmission time intervals, sTTI, or a mini-slot/non-slot-based frame structure comprising just a few OFDM symbols.

The wireless communication system may be any single-tone or multicarrier system using frequency-division multiplexing, like the orthogonal frequency-division multiplexing, OFDM, system, the orthogonal frequency-division multiple access, OFDMA, system, or any other Inverse Fast Fourier Transform, IFFT, based signal with or without Cyclic Prefix, CP, e.g., Discrete Fourier Transform-spread-OFDM, DFT-s-OFDM. Other waveforms, like non-orthogonal waveforms for multiple access, e.g., filter-bank multi-carrier, FBMC, generalized frequency division multiplexing, GFDM, or universal filtered multi carrier, UFMC, may be used. The wireless communication system may operate, e.g., in accordance with 3GPPs LTE, LTE-Advanced, LTE-Advanced Pro, or the 5G or 5G-Advanced or 6G or 3GPPs NR, New Radio, or within LTE-U, LTE Unlicensed or NR-U, New Radio Unlicensed, which is specified within the LTE and within NR specifications.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations. In addition to the above-described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro or 5G or 5G-Advanced or NR, New Radio, or a possible future 6G radio system.

In mobile communication networks, for example in a network like that described above with reference to FIG. 1, like an LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. An RSU may have a functionality of a BS or of a UE, depending on the specific network configuration. Other UEs may not be vehicular related UEs and may comprise any of the above-mentioned devices. Such devices may also communicate directly with each other, D2D communication, using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are necessarily outside one of the cells depicted in FIG. 1, rather, it means that these UEs may not be connected to a base station, for example, they are not in an RRC connected state, so that the UEs do not receive from the base station any sidelink resource allocation configuration or assistance, and/or may be connected to the base station, but, for one or more reasons, the base station may not provide sidelink resource allocation configuration or assistance for the UEs, and/or may be connected to the base station that may not support NR V2X services, e.g., GSM, UMTS, LTE base stations or a WiFi AP.

In wireless communication networks or systems, like the one described above with reference to FIG. 1, a UE may be required to perform one or more measurements, e.g., for initiating a handover, HO, through Layer 3, L3, measurements or through L1/L2 Triggered Mobility, LTM, measurements, the latter offering certain improvements in handover latency and a reduction of interruption times relative to Layer 3-based mobility measurements.

It is noted that the information in the above section is only for enhancing the understanding of the background of the invention and, therefore, it may contain information that does not form conventional technology that is already known to a person of ordinary skill in the art.

Starting from the above, there may be a need for improvements or enhancements of L1/L2 Triggered Mobility, LTM, procedures.

SUMMARY

An embodiment may have a user device, UE, for a wireless communication system or network, wherein the UE is configured or preconfigured to monitor a plurality of beams for a predefined time period for one or more predefined event criteria, wherein the UE is to determine a meeting of the one or more predefined event criteria using a Layer1 measurement, the one or more of the predefined event criteria having one or more of the following: LTM2, LTM3, LTM4, LTM5, wherein, responsive to meeting one or more of the predefined event criteria during the predefined time period, the UE is to perform one or more configured or preconfigured actions, the one or more configured or preconfigured actions have providing a measurement report, and wherein the UE is to send the measurement report to a network entity of the wireless communication system or network in case a leaving condition is met, the measurement report having a channel state information reference signal resource indicator and/or a SS/PBCH Block Resource Indicator.

Another embodiment may have a network entity for a wireless communication system, wherein the network entity is to serve one or more of a plurality of user devices, UE, of the wireless communication system, the network entity is to configure a UE to monitor a plurality of beams for a predefined time period for one or more predefined event criteria, determine a meeting of the one or more predefined event criteria using a Layer1 measurement, the one or more of the predefined event criteria having one or more of the following: LTM2, LTM3, LTM4, LTM5, responsive to meeting one or more of the predefined event criteria during the predefined time period, perform one or more configured or preconfigured actions, the one or more configured or preconfigured actions have providing a measurement report, and send the measurement report to the network entity in case a leaving condition is met, the measurement report having a channel state information reference signal resource indicator and/or a SS/PBCH Block Resource Indicator.

According to another embodiment, a method for operating a user device, UE, for a wireless communication system or network may have the steps of: monitoring a plurality of beams for a predefined time period for one or more predefined event criteria, determining a meeting of the one or more predefined event criteria using a Layer1 measurement, the one or more of the predefined event criteria having one or more of the following: LTM2, LTM3, LTM4, LTM5, performing, responsive to meeting one or more of the predefined event criteria during the predefined time period, one or more configured or preconfigured actions, the one or more configured or preconfigured actions have providing a measurement report, and sending the measurement report to a network entity of the wireless communication system or network in case a leaving condition is met, the measurement report having a channel state information reference signal resource indicator and/or a SS/PBCH Block Resource Indicator.

BRIEF DESCRIPTION OF THE DRAWINGS

Embodiments of the present invention are now described in further detail with reference to the accompanying drawings, in which:

FIG. 1(A) and FIG. 1(B) illustrate a wireless communication network, wherein FIG. 1(A) is a schematic representation of an example of a terrestrial wireless network, and FIG. 1(B) is a schematic representation of an example of a radio access network, RAN;

FIG. 4 illustrates a signaling for an event based LTM reporting in accordance with embodiments of the first aspect of the present invention;

FIG. 7 illustrates a conditional handover LTM configuration in accordance with embodiments of the second aspect of the present invention.

DETAILED DESCRIPTION OF THE INVENTION

Figure 1A:
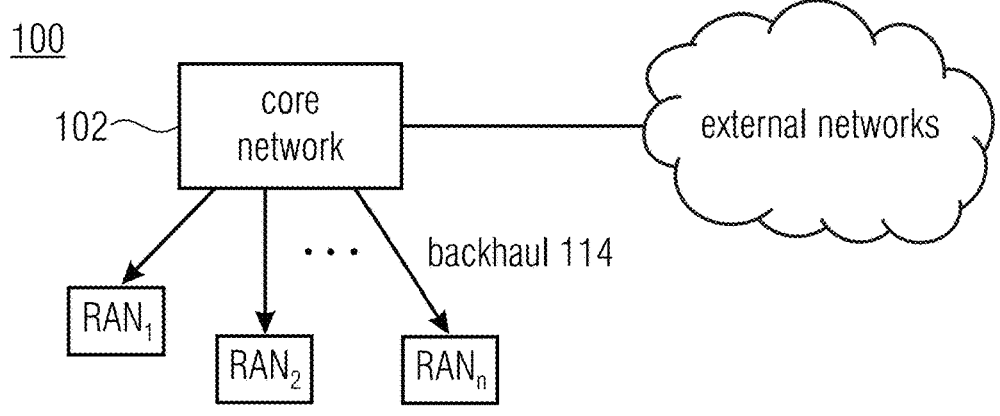

Embodiments of the present invention are now described in more detail with reference to the accompanying drawings, in which the same or similar elements have the same reference signs assigned.

A wireless communication network or system, like the one described above with reference to FIG. 1, which may be a current 5G NR systems, may implement a certain mobility control. For instance, in the RRC_CONNECTED mode, a network-controlled mobility may be utilized for the UEs. The network-controlled mobility is classified into two categories of mobility: cell-level mobility and beam-level mobility. Beam level mobility includes intra-cell beam level mobility and inter-cell beam level mobility.

A cell level handover involves a handover process where a UE switches from a serving cell to a different neighboring cell. A cell selection occurs whenever a new camping cell is better than the serving cell in terms of one or more measured parameters, e.g. Reference Signal Received Power, RSRP, or Reference Signal Received Quality, RSRQ. In an intra-frequency handover, a UE transitions between various cells that operate on the same frequency. Conversely, when the serving and target gNB are on different carrier frequencies, they are considered to be inter-frequency neighbors.

At a beam-level, a handover refers to the procedure where the UE transitions between beams within the same and different cells. Beam level mobility is carried out based on CSI-RS measurements.

For a beam level mobility, like an intra-cell beam level mobility or an inter-cell beam level mobility, the wireless communication network or system may implement beam management. Beam management is a set of techniques to establish and maintain optimal directional links between the base station (gNB) and the user equipment (UE) in 5G networks, especially high frequency bands, e.g., in the millimeter wave (mmWave) frequency bands. Beam management involves the following procedures:

Beam sweeping: This is the process of covering a spatial area with a set of beams transmitted and received according to pre-specified intervals and directions.

Beam measurement: This is the evaluation of the quality of the received signal at the gNB or at the UE, using metrics such as RSRP, RSRQ, SINR, or SNR.

Beam determination: This is the selection of the suitable beam or beams either at the gNB or at the UE, based on the beam measurements.

Beam reporting: This is the procedure used by the UE to send beam quality and/or beam decision information to the gNB.

Beam management is performed in both idle mode, when the UE does not have active data transmission, and in connected mode, when the UE is exchanging data with the gNB. In idle mode, the UE uses the synchronization signal block (SSB) to perform initial access and cell search. The SSB includes primary and secondary synchronization signals (PSS, SSS) and the physical broadcast channel (PBCH), which carry essential information for the UE to synchronize and connect to the gNB. The SSB is transmitted using a fixed beam pattern that covers the entire cell. The UE measures the SSB and reports the best beam index to the gNB. The gNB then uses the reported beam index to steer the beam towards the UE for subsequent transmissions.

In connected mode, the UE and the gNB use different reference signals for beam management. The gNB uses the channel state information reference signal (CSI-RS) to transmit beams to the UE, which are used by the UE to measure and report. The UE uses the sounding reference signal (SRS) to transmit beams to the gNB, which can be used at the gNB to measure and determine the uplink radio channel characteristics. The gNB and the UE also exchange beam failure and recovery information using the radio link control (RLC) and medium access control (MAC) protocols.

In connected mode, the gNB configures the UE with multiple CSI-RS resources, which describe a CSI-RS (reference symbol) in terms of the REs it is transmitted on and its periodicity, its bandwidth, its time offset, etc. One or more CSI-RS resources are bundled in CSI resource sets. One or more CSI resource sets belong to a CSI resource configuration that is usually associated with a CSI report configuration (CSI-ReportConfig). The CSI-ReportConfig defines how often and when a UE is supposed to report the measurements, e.g. periodically, aperiodic, or triggered etc. Then the UE reports per CSI resource set. For beam management purposes, the UE is configured to report the L1-RSRP.

In a reporting occasion, the UE determines up to 4 (dependent on the configuration) strongest beams and reports their CSI-RS resource indicator (CRI) and the associated L1-RSRP. The CRI is the index of a CSI-RS resource within a CSI resource set by which the beam is uniquely identified. Each CSI-RS resource is transmitted using a specific refined beam. Hence, the CRI identifies a CSI-RS resource and by that a specific beam. So the terms CRI and beam or beam ID or CSI-RS or CSI-RS resource may be used interchangeably. Furthermore, when the gNB actually transmits data, i.e. PDSCH, to the UE it uses the Transmit Configuration Indicator (TCI) that may be configured or indicated explicitly in the DCI. The TCI state links a data transmission, PDSCH or PUSCH, to up to two reference signals, e.g. a CSI-RS, SSB, SRS etc. Furthermore, it states shared properties of the beams in the form of the quasi-co-location (QCL) parameter. For example, if a SSB and a PDSCH are linked with QCL Type D, it means that they only share Rx properties. In particular, this means that the gNB may use a fine beam for the PDSCH but a coarse beam for the SSB. Both beams although being different share the same direction, hence they are QCLed Type D. In practice, this means that the UE may use the same Rx beam to receive the PDSCH but cannot assume that other parameters are the same. Furthermore, the UE may link a CSI-RS resource to the PDSCH with QCL Type A, which essentially means that the PDSCH and the CSI-RS have been transmitted using the same beam. Hence, the UE can use more reception parameters, such as the Doppler shift, Doppler spread, average delay, delay spread, that it obtained from measuring the said CSI-RS to equalize and decode the PDSCH reception. Thus, the TCI or TCI state essentially also identifies a certain beam or beam ID and hence, can be used interchangeably. Furthermore, as mentioned previously, SSBs or DMRS may also be transmitted using a certain beam and the UE may use an SSB ID or SSB index or DMRS index to identify the certain beam. Hence, the SSB ID, DMRS index and SSB index may identify a certain beam or beam ID and may be used interchangeably.

Until NR Release 17, all handovers were initiated through Layer 3, L3, measurements, involving an RRC signaling to switch between the primary cell, PCell, and the primary secondary cell, SCell. This process necessitates a reconfiguration of the upper layers, e.g., of the Radio Resource Control, RRC, layer or of the Packet Data Convergence Protocol, PDCP, layer, and/or a reset of the lower layers, like the Medium Access Control layer, MAC, layer or of the physical, PHY, layer. This, however, results in an increased latency, a greater overhead, and prolonged interruption times when compared to beam level mobility.

With the introduction of NR Release 18, L1/L2 Triggered Mobility, LTM, allows for serving cell changes via a L1/L2 signaling, which maintains the upper layer configurations and minimizes the alterations or changes to the lower layer configurations. LTM offers improvements in the handover latency and a reduction of the interruption times when compared to a Layer 3-based mobility.

However, LTM has certain limitations when compared to L3 mobility. For instance, L1 measurements for LTM procedures are restricted to SSB measurements. Expanding L1 measurements to include CSI-RS may facilitate a greater throughput on the target cell immediately following the cell switch so there is a need for using the different reference signals in conjunction.

Another limitation is that the L3 mobility relies on a L3 measurement reporting, which allows UE-evaluated events to trigger measurement reports, thereby reducing the signaling when overhead compared to a periodic measurement reporting. However, such event triggering is not supported by the L1 measurements used for LTM mobility. Additionally, the legacy event triggering mechanism may not be directly utilize due to the greater variability of the L1 measurements.

Further the L3 mobility has advanced over several releases. A conditional Handover, CHO, and other conditional mobility procedures, like a Conditional PSCell Addition or Change, CPAC or a Subsequent Conditional PSCell Addition or Change, SCPAC, were developed to enhance the robustness by allowing the procedure to be executed without requiring a prior signaling exchange with the source cell. While LTM provides short interruption times, it does not match the robustness of conditional L3 mobility procedures. Thus, there is a need to eliminate these limitations for enabling the system to benefit from both a high robustness and short interruption times.

In 5G NR, RSRP measurements may be performed and reported at Layer 1 and Layer 3. For example, a UE can provide SS-RSRP measurements at Layer 1 when sending a CSI measurement report to the gNB and at Layer 3 when sending an RRC measurement report to the gNB. A description and representation of a legacy measurement reporting procedure may be found, e.g., in chapter 5.5.5 of the 3GPP specification TS 138 331 v18.1.0. A description of the LTM reporting procedure may be found, e.g., in chapter 2.4 of the 3GPP specification TS 138.212 v18.2.0.

Thus, there may be a need for improvements or enhancements of L1/L2 Triggered Mobility, LTM, procedures, e.g., providing approaches allowing for an alignment of measurements of reference signals, like the same reference signals or different reference signals, which may then be used in conjunction, when deciding whether a certain operation is to be performed, e.g., a HO, and/or eliminating LTM limitations for enabling a system to benefit from both a high robustness and short interruption times.

Figure 1B:
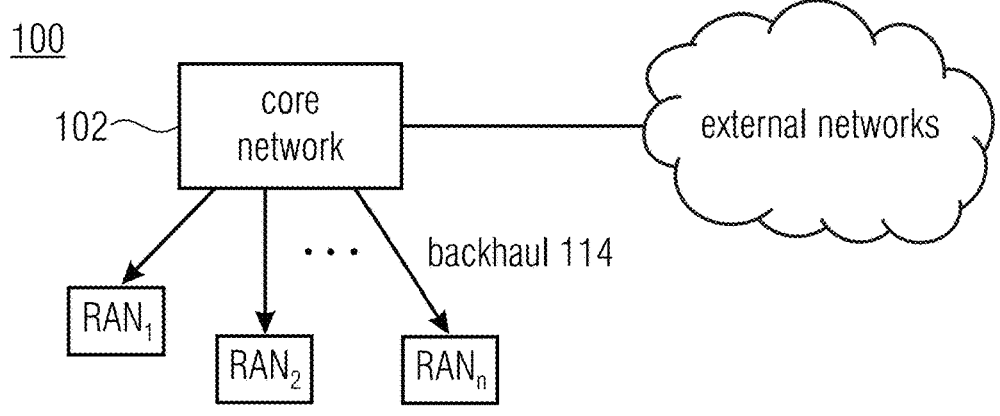
Figure 2:
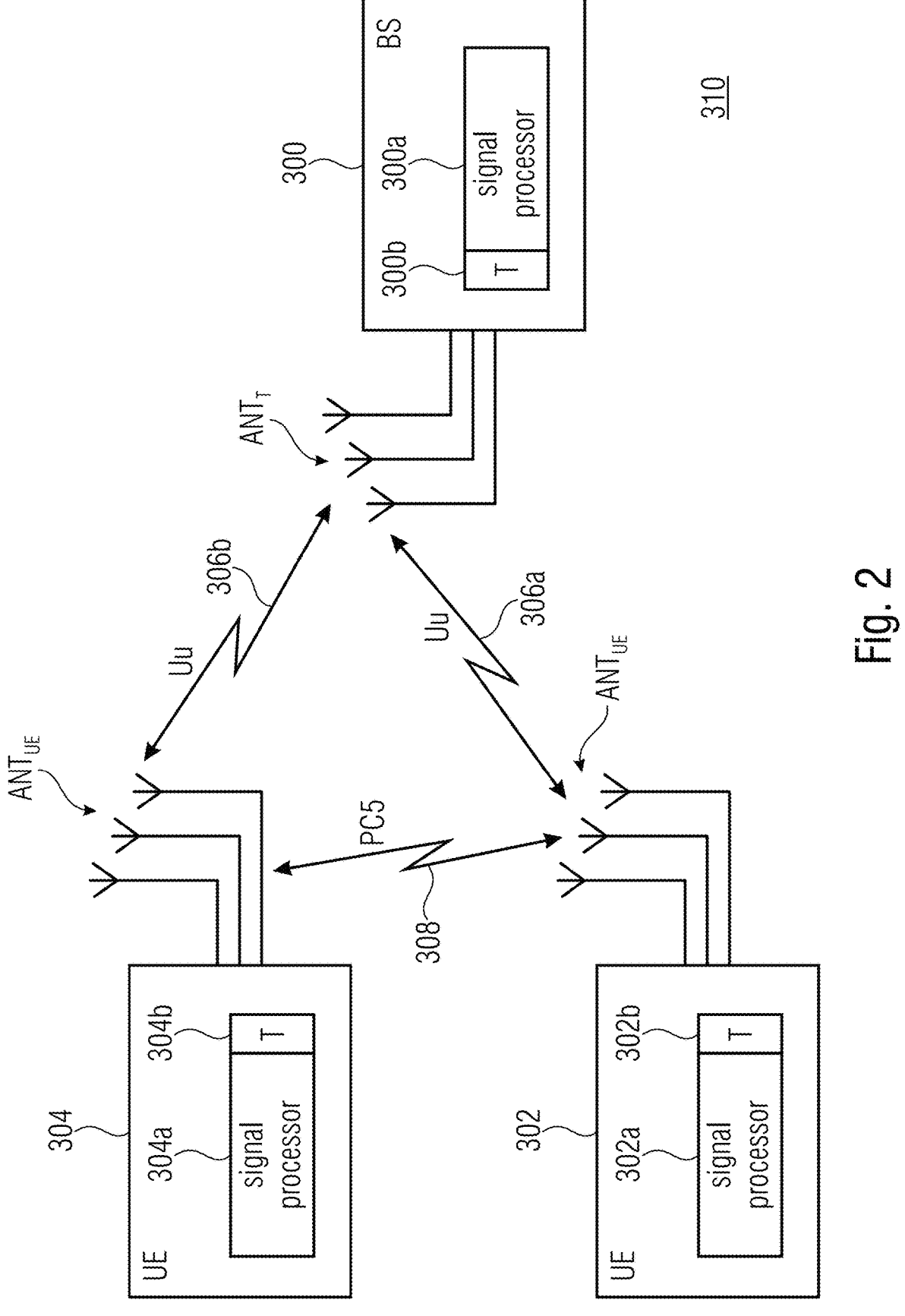
FIG. 2 is a schematic representation of a wireless communication system including a transmitter, like a base station, and one or more receivers, like user devices, UEs, implementing embodiments of the present invention.

Embodiments of the present invention provide of L1/L2 Triggered Mobility, LTM, procedures and may be implemented in a wireless communication system as depicted in FIG. 1 including base stations and users, like mobile terminals or IoT devices. FIG. 2 is a schematic representation of a wireless communication system 310 including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5 or sidelink, SL, interface.

When the UEs are not served by the base station or are not connected to the base station, for example, they are not in an RRC connected state, or, more generally, when no SL resource allocation configuration or assistance is provided by a base station, the UEs may communicate with each other over the sidelink. The system or network of FIG. 2, the one or more UEs 302, 304 of FIG. 2, and the base station 300 of FIG. 2 may operate in accordance with the inventive teachings described herein.

First Aspect

In accordance with a first aspect of the present invention, measurements of reference signals to be performed by a UE, like L1 measurements for LTM procedures, may be aligned, e.g., measurements of the same or of different reference signals.

In accordance with embodiments of the first aspect of the present invention, measurements of the same reference signals may be aligned. This alignment process may involve synchronizing and comparing measurements from the same type of reference signals, such as Synchronization Signal Blocks (SSB) or Channel State Information Reference Signals (CSI-RS). This alignment process may be used for enhancing the accuracy and reliability of measurements used for mobility decisions, such as handovers.

In accordance with further embodiments of the first aspect of the present invention, measurements of the different reference signals may be aligned. This alignment process may involve synchronizing and comparing measurements from the different types of reference signals, such as Synchronization Signal Blocks (SSB) and Channel State Information Reference Signals (CSI-RS). This alignment process may be used for enhancing the accuracy and reliability of measurements used for mobility decisions, such as handovers.

In accordance with other embodiments of the first aspect of the present invention, measurements are no longer restricted to be only SSB measurements or only CSI-RS measurements, rather both of the different reference signals may be measured since an alignment of the measured reference signals is provided so as to make the measured reference signals, i.e., the respective measured values thereof, comparable. Conventionally, only a SSB measurement or only a CSI-RS measurement is supported or a L1 measurement resource configuration in accordance with an LTM configuration. For supporting such a configuration, conventionally, a UE has to perform a measurement on the basis of the same type of reference signals between a current beam and a candidate beam. For example, in NR release 18, L1 measurements rely on the SSB reference signals to evaluate a cell quality. However, CSI-RS measurements may provide for a data resolution when compared to SSB measurements, for example, due to the operation over narrower beams. However, neither the existing LTM reporting framework nor the existing CSI reporting framework nor any other conventional handover framework support a reporting of a measurement of a plurality of reference signals of different types, for example, of a measurement and reporting of both the SSB measurements and the CSI-RS measurements at the same time.

Contrary thereto, in accordance with embodiments of the first aspect of the present invention, as mentioned above, the use of reference signals of different types is enabled, and embodiments of the first aspect of the present invention provide a new measurement and reporting framework allowing the UE to be configured in such a way that it is capable to compare different types of reference signals, for example, the reference signals provided by a serving beam or by a serving cell, like CSI-RS, and the reference signals provided by one or more candidate cells or candidate beams, like SSB reference signals. Embodiments of the first aspect of the present invention provide a UE that is capable of using different types of reference signals for performing a certain operation, like an event evaluation, and that is capable of comparing the measurements of the two or more reference signals.

The present invention provides a user device, UE, for a wireless communication system, wherein the UE is configured or preconfigured to measure a certain parameter using a plurality of reference signals, the plurality of reference signals including at least a first reference signal and a second reference signal, and the UE is to use one or more offsets for adapting one or both of a first parameter value for the certain parameter and a second parameter value for the certain parameter, the first parameter value obtained by measuring the first reference signal and the second parameter value obtained by measuring the second reference signal.

In accordance with embodiments, the first reference signal is of a first type and the second reference signal is of a second type, the first and second types being different.

In accordance with embodiments, the first reference signal is from a first cell and the second reference signal is from a second cell, the first and second cells being different.

In accordance with embodiments, when deciding whether to trigger an event, the UE is to consider the one or more offsets.

In accordance with embodiments, the UE is configured or preconfigured with a report configuration for providing a measurement report to report at least a part of the measurements of the first and second reference signals.—

In accordance with embodiments, the certain parameter comprises a single parameter, or more than one parameter, e.g., a set or a list of parameters.

In accordance with embodiments, the one or more offsets are based on differences in transmission and/or reception properties for the first and second reference signals.

In accordance with embodiments, t the transmission and/or reception properties comprise one or more of the following:

radio channel conditions within one or more cells transmitting the first and second reference signals, a line of sight, LOS, property, e.g., if a UE has a direct LOS path to the one or more cells a LOS property is evaluated based on a channel condition number, CCN, radio beams used by one or more cells for transmitting the first and second reference signals, a number of antennas used for transmitting and/or the first and second reference signals, a number of radio beams used for receiving the first and second reference signals, a hybrid beamformer configuration, automatic gain control, AGC, settings for transmitting and/or receiving the first and second reference signals, a transmission power used for transmitting and/or receiving the first and second reference signals, a beamforming gain used for transmitting and/or receiving the first and second reference signals, a polarization used by one or more cells for transmitting the first and second reference signals, e.g., the first reference signal is transmitted with a horizontal polarization, and the second reference signal is transmitted with a vertical polarization, an operating frequency used by one or more cells for transmitting the first and second reference signals.

In accordance with embodiments, the first and/or second parameter value comprise one or more of the following:

a reference signal received power, RSRP, e.g., L1-RSRP, a reference signal received quality, RSRQ, a signal to noise ratio, SNR, a signal to noise and interference ratio, SINR, e.g., L1-SINR, an interference level, e.g., interference power, a reference signal strength indicator, RSSI, a channel condition, e.g., a channel condition number, a rank indication, e.g., a rank indicator, RI, a preferred matrix index, PMI, a beamforming quality indicator, BFI, e.g., providing information about the quality of the beamforming used in transmission using more than one antenna, a channel quality indicator, CQI, delay and/or doppler parameters.

In accordance with embodiments, the one or more offsets comprise at least one first offset for a first network entity transmitting the first reference signal, and at least one second offset for a second network entity transmitting the second reference signal.

In accordance with embodiments, the one or more offsets are determined using one or more configured or preconfigured thresholds.

In accordance with embodiments, the UE is configured or preconfigured with the one or more offsets or is to obtain the one or more offsets via a dynamic indication.

In accordance with embodiments, the UE is to receive the one or more offsets during an LTM preparation step via a L1/L2 Triggered Mobility, LTM, configuration, or from a network entity, like a gNB, which serves the UE, e.g., via Downlink Control information, DCI, or a Medium Access Control Element, MAC CE, message, or a UAI UE assistance information via PC5, message or via a Radio Resource Control Information Element, RRC IE.

In accordance with embodiments, the UE is to request the one or more offsets from a network entity, like a gNB.

In accordance with embodiments, the UE requests the network entity responsive to one or more predefined criteria.

In accordance with embodiments, the one or more predefined criteria comprise one or more of the following:

the UE experiences a change in channel quality, e.g., a channel degradation or improvement, the UE is to perform a handover, HO, or a conditional handover, CHO.

In accordance with embodiments, the one or more offsets comprise on or more of the following:

an absolute value in the unit of the certain parameter, a range of values in the unit of the certain parameter, e.g., one or more values between a minimum value and a maximum value, a mean value, a percentile, e.g., a 50%-percentile, e.g., a median, a variance, a covariance, a standard deviation, a confidence interval, a factor, a function, a mapping.

In accordance with embodiments, the UE is to choose a value from the range of values randomly or according to one or more criteria.

In accordance with embodiments, the one or more criteria comprise one or more of the following:

a type of event, a configuration ID, a cell ID, an event ID, a beam ID, a type of reference signal, one or more transmission properties, a cell group, e.g., MCG, SCG, a type of antenna, a reference signal strength, e.g. RSRP, a difference between measurements e.g., a differential RSRP, a number of radio beams used by one or more cells for transmitting the first and second reference signals, a number of antennas used for transmitting and/or receiving the first and second reference signals, a number of radio beams used for receiving the first and second reference signals, a hybrid beamformer configuration, automatic gain control, AGC, settings used for transmitting and/or receiving the first and second reference signals, a transmission power used for transmitting the first and second reference signals, a beamforming gain used for transmitting and/or receiving the first and second reference signals.

In accordance with embodiments, the plurality of reference signals are provided by one or more network entities of the wireless communication system.

In accordance with embodiments, the one or more network entities of the wireless communication system comprise one or more of the following:

one or more certain cells of the wireless communication system, one or more antenna ports, one or more antennas, a serving cell, a candidate cell, a group of candidate cells, a master cell group, MCG, a secondary cell group, SCG, a primary cell, PCell, a secondary cell, SCell, a transmission and reception point, TRP, a special cell, SpCell, e.g., a serving primary cell of a MCG, a core network, CN, entity, e.g., a network function.

In accordance with embodiments, the UE is to send a measurement report to a network entity of the wireless communication system, the measurement report including one or both of the first parameter value for the certain parameter and the second parameter value for value for the certain parameter.

In accordance with embodiments, the UE is to send the measurement report responsive to one or more events.

In accordance with embodiments, the report comprises one or more of the following:

an offset, an event type, e.g., LTM event, an event ID a first reference signal beam ID, a first cell ID a first cell configuration ID a second cell ID a second reference signal beam ID a second cell configuration ID e.g., candidate cell(s) configuration a candidate cell group an absolute value of a measurement value, e.g., first and/or second parameter values, aa delta value of measurement values, e.g., differential RSRP a trigger-to-time, TTT.

In accordance with embodiments, the UE is configured or preconfigured with the one or more events using a certain configuration, e.g., an LTM-CSI-ResourceConfig, an LTM-CSI-SSB-ResourceSet, an LTM-Candidate and/or a LTM-SSB-Config.

In accordance with embodiments, responsive to sending the measurement report, the UE is to receive from the network entity an indication to perform one or more operations, e.g., a handover to a target cell.

In accordance with embodiments, the UE is to decide on performing one or more operations, e.g., a handover to a target cell, using one or both of the first parameter value for the certain parameter and the second parameter value for value for the certain parameter.

In accordance with embodiments, the plurality of reference signals comprises one or more of the following:

a Synchronization Signal Block, SSB, e.g., a primary synchronization signal, PSS, and/or a secondary synchronization signal, SSS, a Cell-specific reference signal, CRS, a Channel State Information Reference Signal, CSI-RS, a Demodulation Reference Signal, DM-RS, a Phase-tracking Reference Signal, PT-RS, a Sounding Reference Signal, SRS, a Positioning Reference Signal, PRS, e.g., a downlink PRS or DL-PRS.

The present invention provides a network entity for a wireless communication system, wherein the network entity is to serve one or more of a plurality of user devices, UE, of the wireless communication system, the network entity is to configure a UE to measure a certain parameter using a plurality of reference signals, the plurality of reference signals including at least a first reference signal and a second reference signal, and the network entity is to provide the UE with one or more offsets for adapting one or both of a first parameter value for the certain parameter and a second parameter value for the certain parameter, the first parameter value obtained by measuring the first reference signal and the second parameter value obtained by measuring the second reference signal.

In accordance with embodiments, the network entity is to provide the UE with the one or more offsets during a LTM preparation step via a L1/L2 Triggered Mobility, LTM, configuration, or using a control message, e.g., via Downlink Control information, DCI, or a Medium Access Control Element, MAC CE, message or via a Radio Resource Control Information Element, RRC IE.

In accordance with embodiments, the network entity is to provide the UE with the one or more offsets responsive to a request from the UE.

In accordance with embodiments, the network entity is to determine the one or more offsets using differences in the transmission properties for the first and second reference signals.

In accordance with embodiments, the network entity is to modify or adapt the one or more offsets responsive to one or more of the following:

a change of the transmission properties, one or more data requirements, e.g., a latency or a throughput, a change of an operating frequency used by one or more cells for transmitting the first and second reference signals.

In accordance with embodiments, the transmission properties comprise one or more of the following:

radio channel conditions within one or more cells transmitting the first and second reference signals, a line of sight, LOS, property, e.g., if a UE has a direct LOS path to the one or more cells a LOS property is evaluated based on a channel condition number, CCN, radio beams used by one or more cells for transmitting the first and second reference signals, a number of antennas used for transmitting and/or the first and second reference signals, a number of radio beams used for receiving the first and second reference signals, hybrid beamformer configuration, automatic gain control, AGC, settings for transmitting and/or receiving the first and second reference signals, a transmission power used for transmitting and/or receiving the first and second reference signals, a beamforming gain used for transmitting and/or receiving the first and second reference signals, a polarization used by one or more cells for transmitting the first and second reference signals, e.g., the first reference signal is transmitted with a horizontal polarization, and the second reference signal is transmitted with a vertical polarization, an operating frequency used by one or more cells for transmitting the first and second reference signals.

The present invention provides a method for operating a user device, UE, for a wireless communication system, wherein the UE is configured or preconfigured to measure a certain parameter using a plurality of reference signals, the plurality of reference signals including at least a first reference signal and a second reference signal, the method comprising:

using one or more offsets for adapting one or both of a first parameter value for the certain parameter and a second parameter value for the certain parameter, the first parameter value obtained by measuring the first reference signal and the second parameter value obtained by measuring the second reference signal.

The present invention provides a method for operating a network entity for a wireless communication system, wherein the network entity serves one or more of a plurality of user devices, UE, of the wireless communication system, the method comprising:

configuring a UE to measure a certain parameter using a plurality of reference signals, the plurality of reference signals including at least a first reference signal and a second reference signal, and providing the UE with one or more offsets for adapting one or both of a first parameter value for the certain parameter and a second parameter value for the certain parameter, the first parameter value obtained by measuring the first reference signal and the second parameter value obtained by measuring the second reference signal.

Second Aspect

In accordance with a second aspect of the present invention, an approach is provided which eliminates certain limitations of an LTM mobility procedure, like those described above, thereby enabling a system, like a wireless communication system, to benefit from both a high robustness and a short interruption time. A wireless communication system, like the one described above with reference to FIG. 1, has the capability to configure a time-to-trigger, TTT, for each L3 event with which a UE may be configured. The time-to-trigger represents a duration during which one or more specific criteria for the event need to be satisfied for the UE to actually initiate an action, such as transmitting a measurement report to the network or performing a cell switch or handover. In a legacy L3-event triggered reporting, a UE performs L1-RSRP measurements of neighboring cells. These measurements may be filtered at layer 3 to minimize noise fluctuations and to eliminate outliers. The filtered measurements are reported within an RRC container. This process enables the use of more consistent data on the network side, for example, for a handover decision process. However, this comes at the cost of an increased delay associated with the processing of the measurements, namely the mentioned filtering and reporting via the RRC container. As mentioned above, the LTM mechanism is designed to reduce handover latency and interruption times by using L1 measurements; therefore, using a legacy TTT mechanism performing the filtering described above, renders the improvements of the LTM mechanism obsolete as it leads to an increase in latency. Considering, for example, a situation in accordance with which a current beam, which may correspond to an indicated TCI state, is used for the event evaluation in L1 measurement reporting for a serving cell, during a legacy handover, the UE is configured to monitor whether the one or more event criteria are met within a TTT duration. If the one or more event criteria are met, for example, if a leaving condition is satisfied, the TTT timer is stopped, and the UE may be configured to report to the network that the condition is satisfied. However, when considering L1 measurements, a quality of an L1 beam measurement may fluctuate more dynamically than that of L3 measurements, so that when implementing a legacy L3 TTT reset approach as described above for an L1 event triggered mechanism, the TTT duration or timer may be reset too frequently which leads to the above increased latency, as a handover may be delayed or a radio link failure, RLF, may be experienced.

Embodiments of the second aspect of the present invention provide an approach implementing a an L1 event triggered mechanism that ensures high quality of service by providing the network with a wider view. The UE is allowed to send a measurement report in response to certain events such as a leaving condition, thereby avoiding the above increased latency so that a possibility of a late handover or of a radio link failure is reduced without resetting TTT or timer.

The present invention provides a user device, UE, for a wireless communication system or network, wherein
the UE is configured or preconfigured to monitor a plurality of beams for a predefined time period for one or more predefined event criteria,
wherein the UE is to determine a meeting of the one or more predefined event criteria using a Layer1 measurement, the one or more of the predefined event criteria comprising one or more of the following: LTM2, LTM3, LTM4, LTM5,
wherein, responsive to meeting one or more of the predefined event criteria during the predefined time period, the UE is to perform one or more configured or preconfigured actions, the one or more configured or preconfigured actions comprise providing a measurement report, and
wherein the UE is to send the measurement report to a network entity of the wireless communication system or network in case a leaving condition is met, the measurement report comprising a channel state information reference signal (CSI-RS) resource indicator (CRI) and/or a SS/PBCH Block Resource Indicator (SSBRI).

In accordance with embodiments, for the Layer1 measurement, the UE obtains L1 beam level measurement results by measuring one or multiple reference signals (RSs) as configured by the wireless communication system or network.

In accordance with embodiments, the UE obtains the L1 beam level measurement results by measuring the one or multiple RSs for one or more LTM candidate cells.

In accordance with embodiments, the plurality of beams comprises beams from a serving cell and/or from one or more candidate cells, the plurality of beams including the one or multiple reference signals (RSs) to be measured by the UE for obtaining the L1 beam level measurement results.

In accordance with embodiments, the measurement report is used for indicating to a serving cell or gNB the L1 measurement results from a serving cell and/or one or more candidate cells.

In accordance with embodiments,
the UE is configured by the wireless communication system or network to report the following measurement information based on SS/PBCH block(s): measurement results per SS/PBCH block; SS/PBCH block(s) resource indicator (SSBRI), and/or
the UE is configured by the wireless communication system or network to report the following measurement information based on CSI-RS resources: measurement results per CSI-RS resource; CSI-RS resource indicator (CRI).

In accordance with embodiments, the predefined time period comprises a time-to-trigger (TTT), the measurement report comprises an event triggered L1 measurement report, and events for the event-triggered measurement report comprise one or more of the following: LTM2, LTM3, LTM4, LTM5.

In accordance with embodiments, the TTT is a time during which the leaving condition needs to be consistently satisfied for sending or reporting the event triggered L1 measurement report.

In accordance with embodiments, the event LTM2 is a beam of serving cell becoming worse than a threshold, and the leaving condition for the event LTM2 is satisfied when $$Ms - Hys > Thresh,$$

with
Ms a beam measurement quantity of the serving cell based on SS/PBCH block or CSI-RS,
Hys a hysteresis parameter for the event LTM2,
Thresh a threshold parameter for the event LTM2,
wherein Ms is expressed in dBm in case of RSRP, Hys is expressed in dB, and Thresh is expressed in the same unit as Ms.

In accordance with embodiments, the event LTM3 is a beam of a candidate cell becoming offset better than a beam of a serving cell, and the leaving condition for the event LTM3 is satisfied when $$Mn + Obn + Hys < Ms + Obs + Off,$$

with

Mn beam measurement quantity of the LTM candidate cell based on SS/PBCH block or CSI-RS, Obn offset of the LTM candidate cell Ms a beam measurement quantity of the serving cell based on SS/PBCH block or CSI-RS, Obs offset of the beam of the serving cell, Hys a hysteresis parameter for the event LTM3, Off offset parameter for the event LTM3, wherein Mn, Ms are expressed in dBm in case of RSRP, and Obn, Obs, Hys, Off are expressed in dB.

In accordance with embodiments, the event LTM4 is a beam of a candidate cell becoming better than an absolute threshold, and the leaving condition for the event LTM4 is satisfied when $$Mn + Obn + Hys < Thresh$$

with

Mn beam measurement quantity of the LTM candidate cell based on SS/PBCH block or CSI-RS, Obn offset of the LTM candidate cell Hys a hysteresis parameter for the event LTM4, Thresh a threshold parameter for the event LTM4, wherein Mn is expressed in dBm in case of RSRP, Obn, Hys are expressed in dB, and Thresh is expressed in the same unit as Mn.

In accordance with embodiments, the event LTM5 is a beam of a serving cell becoming worse than a first (threshold1) and a beam of a candidate cell becoming better than a second threshold (threshold2), and the leaving condition for the event LTM5 is satisfied when $$Ms - Hys > Thresh1, \text{ and/or}$$

$$Mn + Obn + Hys < Thresh2$$

with

Ms a beam measurement quantity of the serving cell based on SS/PBCH block or CSI-RS, Mn beam measurement quantity of the LTM candidate cell based on SS/PBCH block or CSI-RS, Obn offset of the LTM candidate cell, Hys a hysteresis parameter for the event LTM5, Thresh1 a threshold parameter for the event LTM5, Thresh2 a threshold parameter for the event LTM5, wherein Mn, MS are expressed in dBm in case of RSRP, Obn, Hys are expressed in dB, Thresh1 is expressed in the same unit as Ms, and Thresh2 is expressed in the same unit as Mn.

In accordance with embodiments, the one or more configured or preconfigured actions further comprise one or more of the following:

initiating and/or performing a handover procedure, initiating and/or performing a conditional handover procedure.

In accordance with embodiments, the plurality of beams comprises a first beam and a second beam, the first beam of the plurality of beams associated with a serving cell and the second beam of the plurality of beams associated with a candidate cell, e.g. a cell neighboring the serving cell.

In accordance with embodiments, the plurality of beams are provided by one or more network entities of the wireless communication system or network, of the wireless communication system or network comprises one or more of the following: a serving cell, and/or a candidate cell.

In accordance with embodiments, responsive to terminating predefined time period, the UE is to send a report to a network entity of the wireless communication system or network, the report indicating whether or not the one or more predefined event criteria are met.

In accordance with embodiments, the measurement report further comprises one of more of the following:

a beam ID, a cell ID, e.g., secondary cell IDs a configuration ID, an indication of the monitored beams, a SSB index, a CSI-RS ID, a number of monitored beams, one or more or all primary beams, one or more or all secondary beams, one or more or all secondary cells, a last primary beam monitored, a last secondary beam monitored.

The present invention provides a network entity for a wireless communication system, wherein the network entity is to serve one or more of a plurality of user devices, UE, of the wireless communication system, the network entity is to configure a UE to monitor a plurality of beams for a predefined time period for one or more predefined event criteria, determine a meeting of the one or more predefined event criteria using a Layer1 measurement, the one or more of the predefined event criteria comprising one or more of the following: LTM2, LTM3, LTM4, LTM5, responsive to meeting one or more of the predefined event criteria during the predefined time period, perform one or more configured or preconfigured actions, the one or more configured or preconfigured actions comprise providing a measurement report, and send the measurement report to the network entity in case a leaving condition is met, the measurement report comprising a channel state information reference signal (CSI-RS) resource indicator (CRI) and/or a SS/PBCH Block Resource Indicator (SSBRI).

The present invention provides a method for operating a user device, UE, for a wireless communication system or network, the method comprising:

monitoring a plurality of beams for a predefined time period for one or more predefined event criteria, determining a meeting of the one or more predefined event criteria using a Layer1 measurement, the one or more of the predefined event criteria comprising one or more of the following: LTM2, LTM3, LTM4, LTM5, performing, responsive to meeting one or more of the predefined event criteria during the predefined time period, one or more configured or preconfigured actions, the one or more configured or preconfigured actions comprise providing a measurement report, and sending the measurement report to a network entity of the wireless communication system or network in case a leaving condition is met, the measurement report comprising a channel state information reference signal (CSI-RS) resource indicator (CRI) and/or a SS/PBCH Block Resource Indicator (SSBRI).

Embodiments of the second aspect of the present invention provide an approach by which a UE may be configured with new TTT reset exception conditions taking into consideration, for example, the higher fluctuations of L1 beams when compared to L3 measurements.

The approach in accordance with embodiments of the second aspect of the present invention is advantageous as the new exceptions make the wireless communication system more robust to fluctuations and reduce a possibility of a late handover or of a radio link failure. The exceptions in accordance with the second aspect of the present invention may be applied to one or both of a current beam or serving beam of a serving cell and the candidate beam of a candidate cell or candidate cell group.

The present invention provides a user device, UE, for a wireless communication system, wherein the UE is configured or preconfigured to monitor a plurality of beams for a predefined time period for one or more predefined event criteria.

In accordance with embodiments, the UE is configured or preconfigured with one or more conditions for an early termination of the monitoring prior to an end of the predefined time period.

In accordance with embodiments, the UE is configured or preconfigured with one or more exceptional conditions causing the UE to not perform the early termination.

In accordance with embodiments, when one or more of the exceptional conditions are met, the UE is not to perform the early termination, and extend the predefined time period in accordance with one or more configured or preconfigured values.

In accordance with embodiments, the UE is to determine a meeting of the one or more predefined event criteria using a Layer1 measurement and/or based on a Layer3 measurement.

In accordance with embodiments, responsive to meeting one or more of the predefined event criteria, the UE is to perform one or more configured or preconfigured actions.

In accordance with embodiments, the one or more configured or preconfigured actions comprise one or more of the following:

providing a measurement report such as a Layer1 measurement report or LTM, e.g., relating to one or more cell-based measurements or one or more beam-based measurements, initiating and/or performing a handover procedure, initiating and/or performing a conditional handover procedure.

In accordance with embodiments, the predefined event criteria is one or more of the following: A1, A2, A3, A4, A5, B1, B2, LTM2, LTM3, LTM4, LTM5.

In accordance with embodiments, the UE is to monitor the plurality of beams during different time instances of the predefined time period.

In accordance with embodiments, the one or more conditions and the one or more exceptional conditions comprise one or more of the following:

a maximum number of beams monitored, a minimum time duration for a beam meeting the one or more predefined event criteria, a remaining duration of the predefined time period, measured signal parameters of the plurality of beams, a change of measured beams, a change of a primary beam, e.g. the current beam from the connected cell, a change of a secondary beam, e.g. the best beam of the neighboring cell changes, a type of reference signal with which the plurality of beams are configured, a change of one or more neighboring cells.

In accordance with embodiments, a primary beam of the plurality of beams is associated with a connected or serving cell and a secondary beam of the plurality of beams is associated with a cell neighboring the connected or serving cell.

In accordance with embodiments, the UE is to terminate the monitoring prior to the end of the predefined time period if a number of beams monitored, e.g., in the predefined time period, exceeds a configured or preconfigured threshold, e.g., one or a certain number of beams.

In accordance with embodiments, the UE is to terminate the monitoring prior to the end of the predefined time period if a time duration during which a monitored beam meets the one or more predefined event criteria is below a configured or preconfigured threshold.

In accordance with embodiments, the UE is to terminate the monitoring prior to the end of the predefined time period if a remaining time to complete the predefined period TTT is above or below a configured or preconfigured threshold.

In accordance with embodiments, the UE is to terminate the monitoring prior to the end of the predefined time period if one or more measured signal parameters of two or more beams provided by the same network entity of the wireless communication system differ.

In accordance with embodiments, the UE is to terminate the monitoring prior to the end of the predefined time period if one or more measured signal parameters of a second beam are lower than the corresponding one or more measured signal parameters of a first beam, or a difference between one or more measured signal parameters of a second beam and the corresponding one or more measured signal parameters of a first beam exceeds a predefined threshold, or a difference between one or more averaged measured signal parameters of a second beam and the corresponding one or more averaged measured signal parameters of a first beam exceeds a predefined threshold.

In accordance with embodiments, the one or more measured signal parameters comprise signal quality values of the beams, e.g., one or more of the following:

a reference signal received power, RSRP, e.g., L1-RSRP, a reference signal received quality, RSRQ, a signal to noise ratio, SNR, a signal to noise and interference ratio, SINR, e.g., L1-SINR, an interference level, e.g., interference power, a reference signal strength indicator, RSSI, a channel condition, e.g., a channel condition number, a rank indication, e.g., a rank indicator, RI, a preferred matrix index, PMI, a beamforming quality indicator, BFI, e.g., providing information about the quality of the beamforming used in transmission using more than one antenna, a channel quality indicator, CQI, delay and/or doppler parameters.

In accordance with embodiments, the UE is to terminate the monitoring prior to the end of the predefined time period if, following the monitoring of a first beam, the UE determines that a later beam is configured with a type of reference signals that is different from the type of reference signal with which the first beam is configured.

In accordance with embodiments, the UE is to terminate the monitoring prior to the end of the predefined time period by stopping or resetting a timer for monitoring the plurality of beams, like a time-to-trigger, TTT, timer.

In accordance with embodiments, the plurality of beams are provided by one or more network entities of the wireless communication system.

In accordance with embodiments, the one or more network entities of the wireless communication system comprises one or more of the following:

one or more certain cells of the wireless communication system, one or more antenna ports, one or more antennas, a serving cell, a candidate cell, a group of candidate cells, a master cell group, MCG, a secondary cell group, SCG, a primary cell, PCell, a secondary cell, SCell, a transmission and reception point, TRP, a special cell, SpCell, e.g., a serving primary cell of a MCG, a core network, CN, entity, e.g., a network function.

In accordance with embodiments, responsive to terminating predefined time period, the UE is to send a report to a network entity of the wireless communication system, the report indicating whether or not the one or more predefined event criteria are met.

In accordance with embodiments, the UE is to send a report to a network entity of the wireless communication system if one or more event criteria are not met.

In accordance with embodiments, the UE is to send a report to a network entity of the wireless communication system in case of one or more of the following:

the predefined time period ends, one or more exceptions occur, a primary beam changes, a secondary beam changes, a secondary cell changes, a leaving condition is met In accordance with embodiments, the report comprises one of more of the following:

a beam ID, a cell ID, e.g., secondary cell IDs a configuration ID, an indication of the monitored beams, a CRI, a SSBRI, a SSB index, a CSI-RS ID, a number of monitored beams, one or more or all primary beams, one or more or all secondary beams, one or more or all secondary cells, a last primary beam monitored, a last secondary beam monitored.

In accordance with embodiments, responsive to sending the report indicating that the one or more predefined event criteria are met, the UE is to receive from the network entity an indication to perform one or more operations, e.g., a handover to a target cell.

In accordance with embodiments, responsive to determining that the one or more predefined event criteria are met, the UE is to perform one or more operations, e.g., a handover to a target cell, and/or responsive to determining that the one or more predefined event criteria are not met, the UE is not to perform one or more operations, e.g., a handover to a target cell.

The present invention provides a network entity for a wireless communication system, wherein the network entity is to serve one or more of a plurality of user devices, UE, of the wireless communication system, the network entity is to configure a UE to monitor a plurality of beams for a predefined time period for one or more predefined event criteria, and the network entity is to configure the UE with one or more conditions for terminating the monitoring prior to an end of the predefined time period.

The present invention provides a method for operating a user device, UE, for a wireless communication system, the method comprising:

monitoring a plurality of beams for a predefined time period for one or more predefined event criteria.

The present invention provides a method for operating a network entity for a wireless communication system, wherein the network entity serve one or more of a plurality of user devices, UE, of the wireless communication system, the method comprising:

configuring a UE to monitor a plurality of beams for a predefined time period for one or more predefined event criteria, and configuring the UE with one or more conditions for terminating the monitoring prior to an end of the predefined time period.

The present invention provides a wireless communication system, comprising:

one or more user devices, UEs of any one of the embodiments of the present invention, and/or one or more network entities of any one of the embodiments of the present invention.

In accordance with embodiments, the UE comprise one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE or Ambient IoT UE, e.g., a sensor, an actuator or a UE provided in a campus network to carry out repetitive tasks and entailing input from a gateway node at periodic intervals, or a mobile terminal, or a stationary terminal, or a cellular IoT-UE, an industrial IoT-UE, IIoT, or a SL UE, or a vehicular UE, or a vehicular group leader UE, GL-UE, or a scheduling UE, S-UE, or an IoT or narrowband IoT, NB-IoT, device, a NTN UE, or a WiFi device or WiFi station, STA, or a ground based vehicle, or an aerial vehicle, or a drone, or a moving base station, or road side unit, RSU, or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or any sidelink capable network entity.

In accordance with embodiments, the network entity comprise one or more of the following: a macro cell base station, or a small cell base station, or a central unit of a base station, or a distributed unit of a base station, or an Integrated Access and Backhaul, IAB, node, or a road side unit, RSU, or a WiFi access point, AP, or a UE, or a SL UE, or a group leader UE, GL-UE, or a relay or a remote radio head, a satellite payload, e.g., a NTN gNB, or an AMF, or an SMF, or a core network entity, or mobile edge computing, MEC, entity, or a network slice as in the NR or 5G core context, or any transmission/reception point, TRP, enabling an item or a device to communicate using the wireless communication network, the item or device being provided with network connectivity to communicate using the wireless communication network.

The present invention provides a computer program product comprising instructions which, when the program is executed by a computer, causes the computer to carry out one or more methods in accordance with the present invention.

Embodiments of the present invention are now described in more detail with reference to the accompanying drawing. It is noted that the subsequently outlined and described aspects or embodiments may be combined such that some or all of the aspects/embodiments are implemented within one embodiment.

Aspect 1

Figure 3:
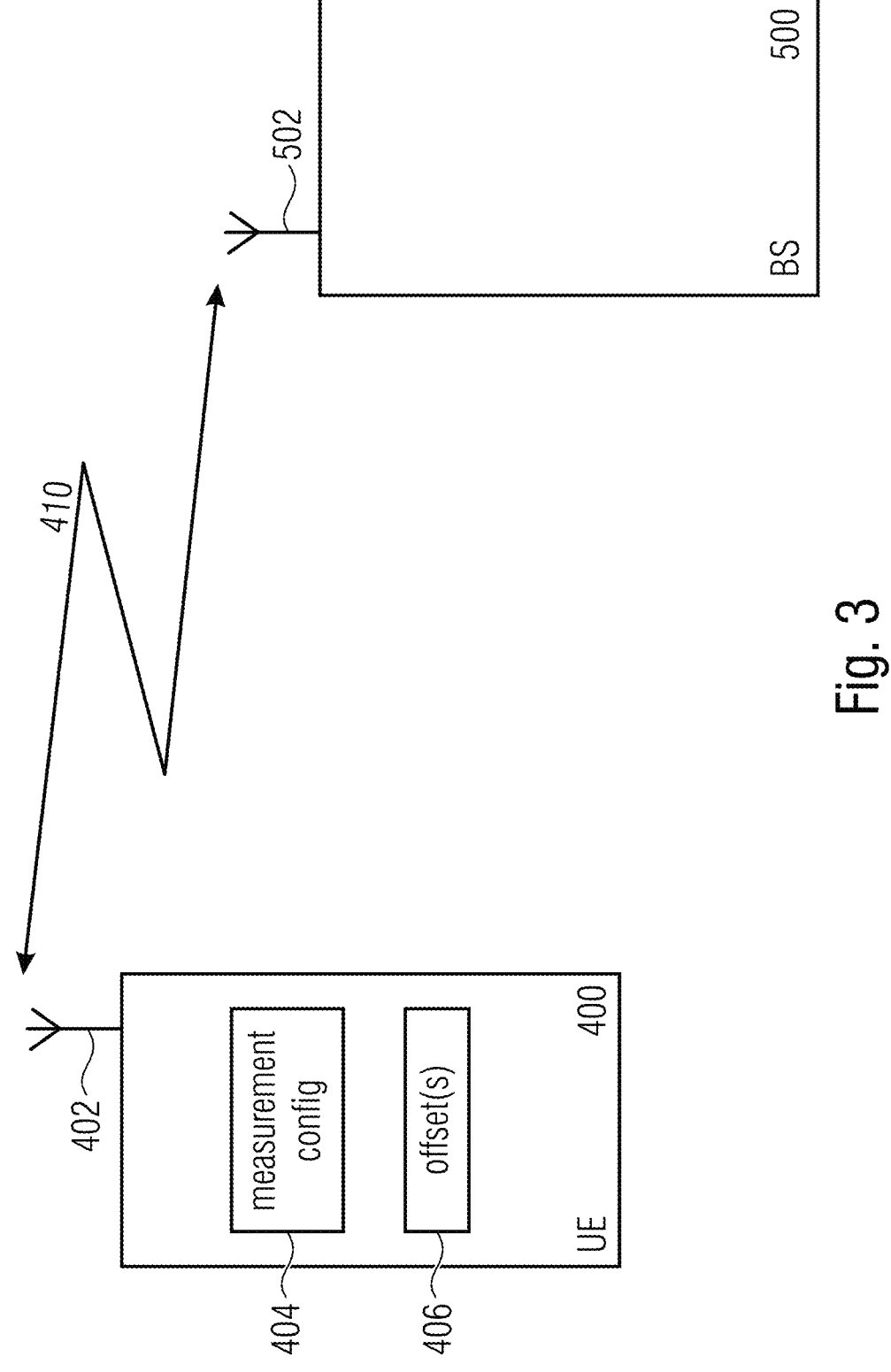
FIG. 3 illustrates a schematic representation of a wireless communication system including a user device, UE, and a network entity operating in accordance with embodiments of a first aspect of the present invention.

FIG. 3 illustrates a schematic representation of a wireless communication system including a user device, UE, 400 and a network entity 500, like a base station operating in accordance with embodiments of the first aspect of the present invention. The UE 400 includes an antenna 402 and is further configured for measuring a certain parameter, like a power level, using different reference signals, for example, SSB reference signals and CSI-RS. The UE 400 uses an offset for adapting one or both of the parameter values obtained by a measurement of the same or different reference signals. Stated differently, the user device 400 is provided for a wireless communication system and is configured or preconfigured to measure a certain parameter using a plurality of reference signals, e.g., by a measurement configuration 404. The plurality of reference signals include at least a first reference signal of a first type and a second reference signal of a second type with the first and second types being the same or different. The UE 400 uses one or more offsets 406 for adapting one or both of a first parameter value for the certain parameter and a second parameter value for the certain parameter. The UE 400 obtains the first parameter value by measuring the first reference signal, and the second parameter value by measuring the second reference signal. The first reference signal may be from a first cell and the second reference signal may be from a second cell, with the first and second cells being different. The certain parameter may be a single parameter or may comprise of more than one parameter, e.g., a set or a list of parameters. The UE 400 may communicate with the network entity 500 over a radio link 410, for example, for receiving the measurement configuration 404 and the one or more offsets and/or for providing a measurement report to the base station 500. The plurality of reference signals may be provided by one or more network entities of the wireless communication system, e.g., by one or more of the following:

one or more certain cells of the wireless communication system,
one or more antenna ports,
one or more antennas,
a serving cell,
a candidate cell,
a group of candidate cells,
a master cell group, MCG,
a secondary cell group, SCG,
a primary cell, PCell,
a secondary cell, SCell, a transmission and reception point, TRP,
a special cell, SpCell, e.g., a serving primary cell of a MCG,
a core network, CN, entity, e.g., a network function.

The reference signals may comprises one or more of the following:

a Synchronization Signal Block, SSB, e.g., a primary synchronization signal, PSS, and/or a secondary synchronization signal, SSS,
a Cell-specific reference signal, CRS,
a Channel State Information Reference Signal, CSI-RS,
a Demodulation Reference Signal, DM-RS,
a Phase-tracking Reference Signal, PT-RS,
a Sounding Reference Signal, SRS,
a Positioning Reference Signal, PRS, e.g., a downlink PRS or DL-PRS.

In accordance with embodiments, when deciding whether to trigger an event, the UE 400 may take to consideration the one or more offsets. Stated differently, the UE decides whether to trigger an event based on the one or more offsets, e.g., For example, the event may be that a measurement report is send or that a conditional handover is performed, and any event criteria is checked after applying the offset to the measurements. If the criteria with the offset applied are fulfilled the UE either reports this and additional data, like the measurement results to the network or performs a conditional handover. In other words, checking the event criteria is based on or uses the aligned measurements.

FIG. 3 also illustrates, as mentioned, a network entity 500 in accordance with an embodiment of the first aspect of the present invention. The network entity, like a gNB or BS, comprises an antenna 502 and is provided for configuring a UE, like UE 400, to measure a certain parameter, like a power level, by using the same or different reference signals, like SSB reference signals and CSI-reference signals. Further, the network entity 500 provides the UE with an offset for adapting one or both of the parameter values obtained by the measurements performed by the UE 400. Stated differently, the network entity 500 of the wireless communication system serves one or more of a plurality of user devices, UEs of the wireless communication system, for example UE 400. The network entity 500 configures the UE 400 to measure a certain parameter using a plurality of reference signals. The plurality of reference signals include at least a first reference signal of a first type and a second reference signal of a second type with the first and second types being the same or different. The network entity 500 provides to the UE 400 one or more offsets for adapting one or both of a first parameter value for the certain parameter and a second parameter value for the certain parameter, the parameters obtained by measurements of the first and second parameter values, respectively.

In accordance with embodiments, the UE 400 may be configured with an information element which may be referred to as a dynamic offset IE or as an LTM_offset IE. Using the offset, the UE 400 performs and reports L1 and/or L3 measurements based on two or more types of reference signals, for example SSB reference signals, CSI-RS and/or DM-RS, within a single measurement configuration. Thus, the first aspect of the present invention enables the UE 400 to assess one of the measured reference signals in relation to another one of the measured reference signals. The reference signals may belong to the same cell and/or to different cells, for example to a serving cell and a candidate cell or to one of a plurality of candidate cells. The offset may be represented as an absolute value, for example as an absolute value in the unit of the measured parameter. For example, when measuring a power level, the absolute value may be defined in units of dB. In accordance with other embodiments, the offset may include a range of values with one or more values between a minimum value and a maximum value. In accordance with further embodiments, the one or more offsets may comprise on or more of the following:

a mean value,
a percentile, e.g., a 50%-percentile, e.g., a median,
a variance,
a covariance,
a standard deviation,
a confidence interval,
a factor,
a function,
a mapping.

In accordance with embodiments, the UE 400 may randomly choose a value from the specific range and evaluate the reference signals relative to each other. The UE may to choose a value from the range of values dependent on one or more of the following:

a type of event, e.g., the offset for a LTM5 event (a beam of a serving cell becomes worse than an absolute threshold1 and a beam of a candidate cell becomes better than another absolute threshold2) may be different, e.g., larger or smaller, than the offset for a LTM3 event (a beam of candidate cell becomes a certain amount better than a beam of a serving cell,
a configuration ID,
a cell ID,
an event ID,
a beam ID,
a type of reference signal,
one or more transmission properties,
a cell group, e.g., MCG, SCG,
a type of antenna,
a reference signal strength, e.g. RSRP,
a difference between measurements e.g., a differential RSRP,
a number of radio beams used by one or more cells for transmitting the first and second reference signals,
a number of antennas used for transmitting and/or receiving the first and second reference signals,
a number of radio beams used for receiving the first and second reference signals,
a hybrid beamformer configuration,
automatic gain control, AGC, settings used for transmitting and/or receiving the first and second reference signals,
a transmission power used for transmitting the first and second reference signals,
a beamforming gain used for transmitting and/or receiving the first and second reference signals.

In accordance with embodiments, the one or more offsets are based on differences in transmission and/or reception properties for the first and second reference signals, for example differences in radio channel conditions when transmitting the first and second reference signals to the UE 400 from one or more cells, or differences in radio beams used by one or more cells for transmitting the first and second reference signals. In accordance with further embodiments, transmission and/or reception properties comprise one or more of the following:

A line of sight, LOS, property. For example, if a UE has a direct LOS path to the one or more cells a LOS property is evaluated based on a channel condition number, CCN. In the context of LOS communication, a lower channel condition number, CCN, indicates a better channel condition, which can be indicative of a clear line of sight between the transmitter and receiver. By monitoring the CCN, the network can assess the quality of the communication channel and adjust the MIMO configuration to optimize performance. If the channel condition number, CCN, is low, it suggests that the communication channel is less affected by interference and multipath fading, which can improve the likelihood of LOS communication. On the other hand, a high CCN indicates a more challenging channel condition, which may entail additional signal processing techniques, such as beamforming or diversity schemes, to improve the communication quality.

A number of antennas used for transmitting and/or the first and second reference signals.
A number of radio beams used for receiving the first and second reference signals.
A hybrid beamformer configuration.
Automatic gain control, AGC, settings for transmitting and/or receiving the first and second reference signals.
A transmission power used for transmitting and/or receiving the first and second reference signals.
A beamforming gain used for transmitting and/or receiving the first and second reference signals.
A polarization used by one or more cells for transmitting the first and second reference signals, e.g., the first reference signal is transmitted with a horizontal polarization, and the second reference signal is transmitted with a vertical polarization
An operating frequency used by one or more cells for transmitting the first and second reference signals.

The one or more offsets may be defined on the basis of information from the respective network entities from the one or more cells sending the reference signals using different transmission properties and therefore having a knowledge for determining the offset.

In accordance with further embodiments, once the UE completed the measurement of the plurality of reference signals and adapted the measured reference signals according to the one or more offsets, the UE 400 may send a measurement report to the gNB 500, e.g., responsive to one or more events. The UE 400 may be configured or preconfigured with a report configuration for providing the measurement report including at least a part of measurements of the first and second reference signals. The first and/or second parameter values may be one or more of the following:

a reference signal received power, RSRP, e.g., L1-RSRP,
a reference signal received quality, RSRQ,
a signal to noise ratio, SNR,
a signal to noise and interference ratio, SINR, e.g., L1-SINR,
an interference level, e.g., interference power,
a reference signal strength indicator, RSSI,
a channel condition, e.g., a channel condition number,
a rank indication, e.g., a rank indicator, RI,
a preferred matrix index, PMI,
a beamforming quality indicator, BFI, e.g., providing information about the quality of the beamforming used in transmission using more than one antenna,
a channel quality indicator, CQI,
delay and/or doppler parameters.

The measurement report may also include one or more of the following:

an offset,
an event type, e.g., LTM event,
an event ID
a first reference signal beam ID, a first cell ID a first cell configuration ID a second cell ID a second reference signal beam ID a second cell configuration ID e.g., candidate cell(s) configuration a candidate cell group an absolute value of a measurement value, e.g., first and/or second parameter values, aa delta value of measurement values, e.g., differential RSRP a trigger-to-time, TTT.

The gNB 500 may evaluate the measurement results and decide on whether a certain operation is to be carried out by the UE or not. For example, when the UE measures reference signals from a serving cell and from a candidate cell, the gNB may decide, on the basis of the aligned measurements, i.e., the measurements adapted by the offset, whether a handover from the serving cell to the candidate cell is to be performed or not. Responsive to this decision, the gNB 500 may inform the UE 400 accordingly. In accordance with yet other embodiments, the decision to perform a certain operation may be also made at the UE 400 on the basis of the aligned measurements. For example, when considering the above mentioned HO scenario, the UE may decide on its own and on the basis of the aligned measurement results whether or not to initiate a HO procedure.

The first aspect of the present invention is advantageous as by enabling the UE 400 to utilize reference signals, the configuration overhead is minimized and a likelihood of late handovers or a radio link failure is reduced. The approach minimizes the configuration overhead and reduces the likelihood of late handovers or radio link failures by allowing the UE 400 to utilize reference signals in a more efficient manner. By enabling the UE 400 to measure and compare different types of reference signals, such as Synchronization Signal Blocks (SSB) and Channel State Information Reference Signals (CSI-RS), the system can make more accurate and reliable mobility decisions. The first aspect enables the UE 400 to perform an accurate comparison of different types of reference signals.

In accordance with embodiments of the first aspect of the present invention, the offset parameter may be indicated by using a configuration or a pre-configuration or it may be indicated dynamically. For example, an offset parameter may be part of an LTM configuration or of a conditional LTM configuration or of a conventional LTM configuration. The offset parameter may be provided to the UE 400, for example, during an LTM preparation step. In accordance with other embodiments, the offset parameter indicating the one or more offsets 406 may be indicated or provided to the UE 400 by the gNB 500, for example via downlink control information, DCI, or a medium access control element, MAC-CE, message, or a UAI UE assistance information via PC5, message or via a Radio Resource Control Information Element, RRC IE. In accordance with embodiments using a dynamic indication, the UE 400 requests the offset when the UE entails the offset to be used, e.g., when the UE experiences a change in channel quality, e.g., a channel degradation or improvement, or when the UE is to perform a handover, HO, or a conditional handover, CHO.

In accordance with such embodiments, the one or more offsets may be modified at the gNB 500, for example when a transmission property for transmitting the respective reference signals has changed, like a radio channel condition within or a beam used by one or more of the cells, like a serving cell and/or one or more candidate cells. Thus, the dynamic indication may be advantageous over a configured/preconfigured indication as it allows aligning the reference signal measurements on the basis of more up-to-date transmission properties thereof which are reflected in the modified offset values.

In accordance with further embodiments, the UE 400 may be configured with an offset 406 that adjusts dynamically based on one or more criteria. For instance, one criterion may be the type of event which allows the gNB to set different offset values for various events. For example, the UE 400 may be assigned a stricter offset value for an LTM5 event, while an offset for an LTM3 event may be more relaxed, or vice versa. In addition, as configurations of the one or more cells, like the serving cell, and the one or more candidate cells, may vary, also various offset values may be established for each cell so that rather than obtaining an up-to-date offset value from the base station, the UE may select from a plurality of offset values the one which is most suitable for a certain transmission property experienced by the reference signals, and this transmission property may be signaled to the UE from the base station so as to allow the UE 400 for selecting the appropriate offset value.

In another embodiment, the one of more offsets may depend on a threshold. For example, the offset is determined by the difference in carrier frequency between the two reference signals, e.g. RS1 is on 3 GHz and RS2 is on 3.5 GHz. The difference is only 0.5 GHz which may be below the 1 Ghz threshold to apply an alignment or the compensation offset. In another embodiment the timing advance, TA, may be used to determine a difference in distance between the origins of RS1 and RS2, thereby allowing for an assessment whether or not to apply an offset to compensate for an additional path loss due to the difference in distance. In a further embodiment the distance may be derived from one or more positioning signals (e.g. PRS) or positioning messages indicating an absolute or relative position of the origins of RS1 and RS2. Thus, the one or more offsets are determined based on one or more configured or preconfigured thresholds. For example, the offset is set to zero when a differential measurement falls below a preconfigured threshold, enabling the UE to directly compare the measured values of the first and second reference signals without any offset adjustment. The range of values of the offset or the absolute value of the offset may be determined based on these thresholds. For example, if a differential RSB value exceeds a specified threshold, the UE may drop one or more of the following beams for determining whether a certain operation is to be performed, for example, for a certain event evaluation. In another example, the offset value may be set to zero indicating that the UE compares the two reference signals with a measured value.

In accordance with yet other embodiments, the gNB 500 may adjust the offset 500 on the basis of certain data requirements, like a latency requirement or a throughput requirement. For instance, for applications with higher latency requirements, the network entity may set a lower offset to allow faster handover to other cells or beams. The offset may also be adjusted dynamically according to the frequency of the measured beams, e.g., responsive to a change of an operating frequency used by one or more cells for transmitting the first and second reference signals.

In the following, an embodiment of a measurement configuration EventTriggerConfig in accordance with the first aspect of the present invention is given.

```
EventTriggerConfig ::= SEQUENCE {
  eventId CHOICE {
    eventA1 SEQUENCE {
      a1-Threshold            MeasTriggerQuantity,
      reportOnLeave           BOOLEAN,
      hysteresis              Hysteresis,
      timeToTrigger           TimeToTrigger,
      LTM_offset              LTM_Offset
    },
    eventA2 SEQUENCE {
      a2-Threshold            MeasTriggerQuantity,
      reportOnLeave           BOOLEAN,
      hysteresis              Hysteresis,
      timeToTrigger           TimeToTrigger,
      LTM_offset              LTM_Offset
```

```
    }
  }
}
```

As may be seen, the measurement configuration above basically corresponds to a configuration as defined, e.g., in TS 138 331 v18.1.0 with the additional parameter "LTM_offset" used for providing the one or more offset values to the UE 400.

FIG. 4 illustrates a signaling for an event based LTM reporting having the following information elements, IEs, each including the above EventTriggerConfig.

```
LTM-CSI-ResourceConfig-new ::= SEQUENCE {
TriggerEvent EventTriggerConfig,
ltm-CSI-ResourceConfigId-r18                   ,
ltm-CSI-SSB-ResourceSet-r18                         LTM-CSI-SSB-ResourceSet-r18,
...
}
LTM-CSI-SSB-ResourceSet-new ::= SEQUENCE {
TriggerEvent EventTriggerConfig,
ltm-CSI-SSB-ResourceList-r18               SEQUENCE (SIZE (1..maxNrofLTM-CSI-SSB-
ResourcesPerSet-r18)) OF SSB-Index,
ltm-CandidateIdList-r18                    SEQUENCE (SIZE (1..maxNrofLTM-CSI-SSB-
ResourcesPerSet-r18)) OF LTM-CandidateId-r18,
...
}
LTM-Candidate-new ::= SEQUENCE {
TriggerEvent EventTriggerConfig,
ltm-CandidateId-r18                   LTM-CandidateId-r18,
ltm-CandidatePCI-r18                  PhysCellId OPTIONAL,          -- Need M
ltm-SSB-Config-r18                    LTM-SSB-Config-r18 OPTIONAL,  -- Need
M
ltm-CandidateConfig-r18                    OCTET STRING (CONTAINING
RRCReconfiguration) OPTIONAL, -- Need M
ltm-ConfigComplete-r18                     ENUMERATED {true} OPTIONAL,   --
Need R
ltm-EarlyUL-SyncConfig-r18                 OCTET STRING (CONTAINING EarlyUL-
SyncConfig-r18) OPTIONAL, -- Need R
ltm-EarlyUL-SyncConfigSUL-r18              OCTET STRING (CONTAINING EarlyUL-
SyncConfig-r18) OPTIONAL, -- Need R
ltm-TCI-Info-r18                 LTM-TCI-Info-r18 OPTIONAL,          -- Need M
ltm-NoResetID-r18                INTEGER (1..maxNrofLTM-Configs-plus1-r18)
OPTIONAL, -- Need M
ltm-UE-MeasuredTA-ID-r18                   INTEGER (1..maxNrofLTM-Configs-plus1-r18)
OPTIONAL, -- Need M
...
}
LTM-SSB-Config-new ::= SEQUENCE {
TriggerEvent EventTriggerConfig,
ssb-Frequency-r18                    ARFCN-ValueNR,
subcarrierSpacing-r18                SubcarrierSpacing,
ssb-Periodicity-r18                  ENUMERATED {ms5, ms10, ms20, ms40, ms80,
ms160, spare2, spare1} OPTIONAL, -- Need R
ssb-PositionsInBurst-r18                   CHOICE {
shortBitmap                    BIT STRING (SIZE (4)),
medium Bitmap                  BIT STRING (SIZE (8)),
longBitmap                     BIT STRING (SIZE (64))
} OPTIONAL, -- Need R
ss-PBCH-BlockPower-r18                      INTEGER (-60..50) OPTIONAL, -- Need R
...
}
-- TAG-LTM-CANDIDATE-STOP
-- ASN1STOP
...
```

As may be seen, the above event based LTM reporting uses information elements, IEs, which basically correspond to IEs as defined, e.g., in TS 138 331 v18.1.0 which include the above EventTriggerConfig.

In a further embodiment, the new configuration may be used for monitoring and reporting, e.g., in LTM handover or LTM conditional handover scenarios where the UE is configured to monitor specific criteria. If the one or more EventTriggerConditions are met, the UE may initiate an action, such as transmitting a measurement report or performing a handover, reducing reporting overhead and/or handover latency and improving the robustness of the wireless communication system.

Aspect 2

Figure 5:
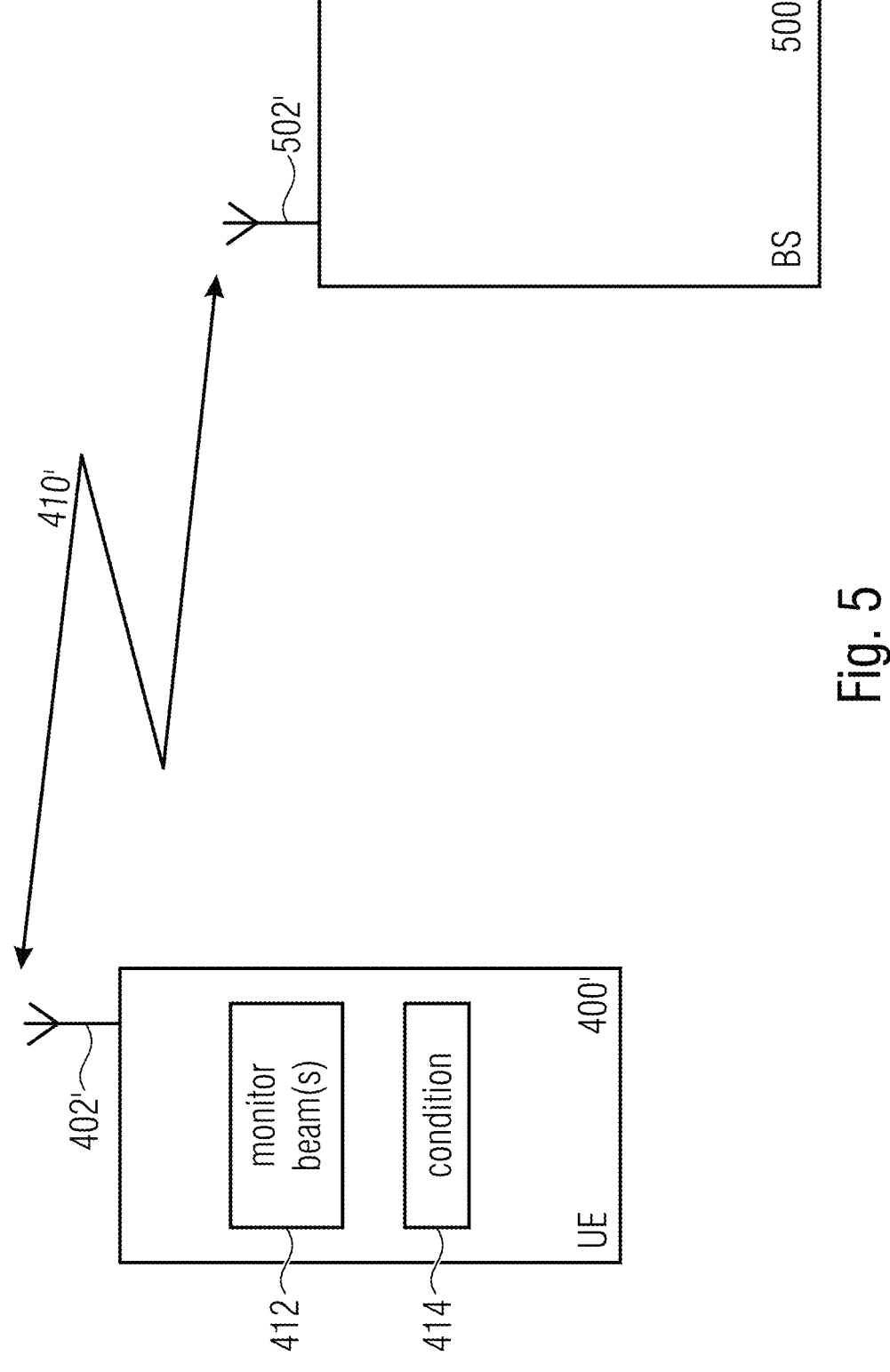
FIG. 5 illustrates a schematic representation of a wireless communication system including a user device, UE, and a network entity operating in accordance with embodiments of a second aspect of the present invention.

FIG. 5 illustrates a schematic representation of a wireless communication system including a user device, UE, 400' and a network entity 500', like a base station or a gNB, operating in accordance with embodiments of the second aspect of the present invention. The UE 400' is configured to monitor different beams during a predefined time period, like a time-to-trigger period, TTT, period, for determining one or more certain event criteria to be fulfilled or not.

In accordance with embodiments, the monitoring of the beam(s) may include a L1 measurement and event triggered reporting.

The wireless communication system or network may configure the UE 400', which may be an RRC_CONNECTED UE, to perform L1 beam level measurements for one or more LTM candidate cells and/or a serving cell, like gNB 500'. The wireless communication system or network may configure the UE 400' to report L1 beam level measurements in accordance with an event triggered L1 measurement configuration. The measurement report is used for indicating to serving gNB 500' the L1 measurement results from the serving cell and/or from the one or more candidate cells. The measurement configuration is provided by means of RRC dedicated signaling.

The wireless communication system or network may configure the UE to report the following measurement information based on SS/PBCH block(s):
Measurement results per SS/PBCH block;
SS/PBCH block(s) resource indicator (SSBRI).

The wireless communication system or network may configure the UE to report the following measurement information based on CSI-RS resources:
Measurement results per CSI-RS resource;
CSI-RS resource indicator (CRI).

The RRC configures the following parameters in the LTM-CSI-ReportConfig and LTM-CSI-ResourceConfig for event triggered L1 measurement and corresponding reporting procedure:
LTM-CSI-ReportConfig for the event-triggered measurement report;
eventTriggered for the event-triggered measurement report;
eventLTM2, eventLTM3, eventLTM4, eventLTM5: events for the event-triggered measurement report;
timeToTrigger time during which an entering/leaving condition needs to be consistently satisfied for reporting event triggered L1 measurement report;
Itm-CandidateReportConfigList: List of report configurations for LTM candidate IDs;
Itm-EventTriggeredPeriodicReport: whether the event triggered L1 measurement report is sent periodically if an LTM event is triggered;

reportOnLeave: whether the event triggered L1 measurement report shall be triggered when leaving condition for an event is satisfied;
Itm-EventTriggeredReportReportContent: the content of the event triggered L1 measurement report.

The measurement may be performed as follows. The UE 400', like an RRC_CONNECTED UE, obtains the L1 beam level measurement results by measuring one or multiple RSs as configured by the wireless communication system or network for the one or more LTM candidate cells with the candidate ID configured in Itm-CandidateReportConfigList for evaluation of reporting criteria. For each L1 beam level measurement result in RRC_CONNECTED, the UE 400' applies the layer 1 filtering by implementation, before using the measured results for evaluation of reporting criteria and measurement reporting. The MAC entity performs the evaluation of reporting criteria as described below based on the L1 measurement results from the lower layer. For the one or more LTM candidate cells with the candidate ID not configured in Itm-CandidateReportConfigList, the UE 400' is not required to perform an event evaluation on the RSs belonging to the candidate ID for the corresponding event.

For the L1 beam level event triggered measurements report, the wireless communication system or network can configure SS/PBCH block(s) or CSI-RS as event evaluation RS type, and L1-RSRP as trigger quantity. The reporting quantity is the same as the trigger quantity.

The measurement report may be triggered as follows. The UE maintains the following UE variables for an event triggered L1 measurement and report procedure:
MR_LIST: includes the list of event triggered L1 measurement report information, including RS resource index of LTM candidate cell(s), L1 measurement result, and type of reporting RS(s) for which the L1 measurement report triggering conditions have been met for TTT. Each entry in the list is associated with a Itm-CSI-ReportConfigId;
MR_SENT_COUNTER: represents the number of event triggered L1 measurement report performed by UE if the triggering condition for the corresponding event is met for TTT for each Itm-CSI-ReportConfigId;
BEAM_ENTERING_LIST: includes the reference signaling resource index of LTM candidate cell(s) for each Itm-CSI-ReportConfigId, for which the L1 measurement report entering conditions have been met for TTT for the triggered L1 measurement report;
BEAM_LEAVING_LIST: includes the reference signaling resource index of LTM candidate cell(s) for each Itm-CSI-ReportConfigId, for which has been reported in the (Truncated) L1 measurement report MAC CE, and the L1 measurement report leaving conditions have been met for TTT for the triggered L1 measurement report;
BEAM_REPORTED_LIST: includes the reference signaling resource index of LTM candidate cell(s) for each Itm-CSI-ReportConfigId, for which has been reported in the (Truncated) L1 measurement report MAC CE, and the L1 measurement report leaving conditions have not been met for TTT.

The MAC entity shall for LTM event evaluation procedure:
1> for each Itm-CSI-ReportConfigId included in the LTM-CSI-ReportConfig:
2> if the corresponding Itm-ReportConfigType is set to eventTriggered and there is Itm-EventTriggeredReportContent configuration:

33

3> if the eventLTM2 is configured in the corresponding Itm-CSI-ReportConfigId:

4> consider only the current beam of serving cell, i.e. the beam corresponds to the RS configured in the indicated TCI State or the RS QCLed with the RS configured in the indicated TCI State indicated by TCI State in the serving cell, with the same RS type as the beam of LTM candidate cell, i.e. the RSs configured in LTM-CSI-ResourceConfig which associated with this Itm-CSI-ReportConfigId, to be applicable;

3> if the eventLTM3, eventLTM4, or eventLTM5 is configured in the corresponding Itm-CSI-ReportConfigId:

4> consider any beam of LTM candidate cell (except the serving cell) configured in Itm-CandidateReportConfigList, i.e. the RSs configured in LTM-CSI-ResourceConfig which associated with this Itm-CSI-ReportConfig/d, to be applicable;

2> if the entry condition for the event associated with Itm-CSI-ReportConfigId is fulfilled for one or more applicable beams, i.e. reference signalling associated with SSB-Index or NZP-CSI-RS-ResourceID in the LTM-CSI-ResourceConfig associated with the LTM-CSI-ReportConfig, which is not in the BEAM_ENTERING_LIST and not in the BEAM_REPORTED_LIST, for the measurement from lower layer during timeToTrigger defined for this event:

3> if the MR_LIST does not include a measurement reporting entry for this Itm-CSI-ReportConfigId (a first RS triggers the event):

4> include a measurement reporting entry in the MR_LIST for this Itm-CSI-ReportConfigId;

3> include the SSBRI or CRI of the concerned beam(s) in the BEAM_ENTERING_LIST for this Itm-CSI-ReportConfigId;

3> initiate the measurement reporting procedure, as described below;

2> else if the leaving condition for the event associated with Itm-CSI-ReportConfigId is fulfilled for one or more applicable beams included in the BEAM_ENTERING_LIST or BEAM_REPORTED_LIST for the measurement from lower layer during timeToTrigger defined for this event:

3> if the MR_LIST does not include a measurement reporting entry for this Itm-CSI-ReportConfigId (a first RS triggers the event):

4> include a measurement reporting entry in the MR_LIST for this Itm-CSI-ReportConfigId;

3> include the SSBRI or CRI of the concerned beam(s) in the BEAM_LEAVING_LIST for this Itm-CSI-ReportConfigId;

3> remove the concerned beam(s) in the BEAM_ENTERING_LIST or BEAM_REPORTED_LIST for this Itm-CSI-ReportConfigId;

3> if reportOnLeave is set to true for this Itm-CSI-ReportConfigId:

4> initiate the measurement reporting procedure, as described below;

2> upon expiry of the periodical reporting timer for this Itm-CSI-ReportConfigId:

3> initiate the measurement reporting procedure, as described below.

NOTE: timeToTrigger is not restarted if the current beam of serving cell changes and the entry condition is still met with the new current beam.

34

NOTE: To evaluate the L1 measurement reporting triggering event, the UE uses the latest L1-RSRP measurement from lower layer.

EventLTM2=a beam of a serving cell becomes worse than a threshold, and the UE shall:

1> consider the entering condition for this event to be satisfied when condition LTM2-1, as specified below, is fulfilled;

1> consider the leaving condition for this event to be satisfied when condition LTM2-2, as specified below, is fulfilled;

Inequality LTM2-1 (Entering Condition)

$$Ms + Hys < Thresh$$

Inequality LTM2-2 (Leaving Condition)

$$Ms - Hys > Thresh$$

The variables in the formula are defined as follows:

Ms is the beam measurement quantity of the serving cell based on SS/PBCH block or CSI-RS, not taking into account any offsets. The beam associated with this event is the current beam, i.e. corresponding to the RS configured in the indicated TCI state or the RS QCLed with the RS configured in the indicated TCI state in the serving cell with the same RS type as the beam of LTM candidate cell, i.e. the RSs configured in LTM-CSI-ResourceConfig.

Hys is the hysteresis parameter for this event (i.e. hysteresis as defined within LTM-CSI-ReportConfig for this event).

Thresh is the threshold parameter for this event (i.e. Itm2-Threshold as defined within LTM-CSI-ReportConfig for this event).

Ms is expressed in dBm in case of RSRP.

Hys is expressed in dB.

Thresh is expressed in the same unit as Ms.

EventLTM3=a beam of a candidate cell becomes offset better than a beam of the serving cell, and the UE shall:

1> consider the entering condition for this event to be satisfied when condition LTM3-1, as specified below, is fulfilled;

1> consider the leaving condition for this event to be satisfied when condition LTM3-2, as specified below, is fulfilled;

Inequality LTM3-1 (Entering Condition)

$$Mn + Obn - Hys > Ms + Obs + Off$$

Inequality LTM3-2 (Leaving Condition)

$$Mn + Obn + Hys < Ms + Obs + Off$$

The variables in the formula are defined as follows:

Mn is the beam measurement quantity of the LTM candidate cell based on SS/PBCH block or CSI-RS, not taking into account any offsets.

Obn is the offset of the LTM candidate cell (i.e. candidateSpecificOffset as defined in LTM-CSI-ReportConfig for this event). One offset is applied to all beam(s) associated with the LTM candidate cell.

Ms is the beam measurement quantity of the serving cell based on SS/PBCH block or CSI-RS, not taking into account any offsets. The beam associated with this event is the current beam, i.e. corresponding to the RS configured in the indicated TCI state or the RS QCLed with the RS configured in the indicated TCI State in the serving cell in the serving cell.

Obs is the offset of the beam of the serving cell (i.e. candidateSpecificOffsetS as defined in LTM-CSI-ReportConfig for this event).

Hys is the hysteresis parameter for this event (i.e. hysteresis as defined within LTM-CSI-ReportConfig for this event).

Off is the offset parameter for this event (i.e. Itm3-Offset as defined within LTM-CSI-ReportConfig for this event).

Mn, Ms are expressed in dBm in case of RSRP.

Obn, Obs, Hys, Off are expressed in dB.

EventLTM4=a beam of a candidate cell becomes better than an absolute threshold, and the UE shall:

1> consider the entering condition for this event to be satisfied when condition LTM4-1, as specified below, is fulfilled;

1> consider the leaving condition for this event to be satisfied when condition LTM4-2, as specified below, is fulfilled.

Inequality LTM4-1 (Entering Condition)

$$Mn + Obn - Hys > Thresh$$

Inequality LTM4-2 (Leaving Condition)

$$Mn + Obn + Hys < Thresh$$

The variables in the formula are defined as follows:

Mn is the beam measurement quantity of the LTM candidate cell based on SS/PBCH block or CSI-RS, not taking into account any offsets.

Obn is the offset of the beam of the LTM candidate cell (i.e. [beamIndividualOffsetN] as defined in LTM-CSI-ReportConfig for this event). One offset is applied to all beam(s) associated with the LTM candidate cell.

Hys is the hysteresis parameter for this event (i.e. hysteresis as defined within LTM-CSI-ReportConfig for this event).

Off is the offset parameter for this event (i.e. Itm4-Offset as defined within LTM-CSI-ReportConfig for this event).

Mn is expressed in dBm in case of RSRP.

Obn, Hys are expressed in dB.

Thresh is expressed in the same unit as Mn.

EventLTM5=a beam of a serving cell becomes worse than a threshold1 and a beam of a candidate cell becomes better than a threshold2, and the UE shall:

1> consider the entering condition for this event to be satisfied when both condition LTM5-1 and condition LTM5-2, as specified below, are fulfilled;

1> consider the leaving condition for this event to be satisfied when condition LTM5-3 or condition LTM5-4, i.e. at least one of the two, as specified below, is fulfilled;

Inequality LTM5-1 (Entering Condition 1)

$$Ms + Hys < Thresh1$$

Inequality LTM5-2 (Entering Condition 2)

$$Mn + Obn - Hys > Thresh2$$

Inequality LTM5-3 (Leaving Condition 1)

$$Ms - Hys > Thresh1$$

Inequality LTM5-4 (Leaving Condition 2)

$$Mn + Obn + Hys < Thresh2$$

The variables in the formula are defined as follows:

Ms is the beam measurement quantity of the serving cell based on SS/PBCH block or CSI-RS, not taking into account any offsets. The beam associated with this event is the current beam, i.e., corresponding to the RS configured in the indicated TCI state or the RS QCLed with the RS configured in the indicated TCI State in the serving cell.

Mn is the beam measurement quantity of the LTM candidate cell based on SS/PBCH block or CSI-RS, not taking into account any offsets.

Obn is the offset of the LTM candidate cell (i.e. [beamIndividualOffsetN] as defined in LTM-CSI-ReportConfig for this event). One offset is applied to all beam(s) associated with the LTM candidate cell.

Hys is the hysteresis parameter for this event (i.e. hysteresis as defined within LTM-CSI-ReportConfig for this event).

Thresh1 is the threshold parameter for this event (i.e. Itm5-Threshold1 as defined within LTM-CSI-ReportConfig for this event).

Thresh2 is the threshold parameter for this event (i.e. Itm5-Threshold2 as defined within LTM-CSI-ReportConfig for this event).

Mn, Ms are expressed in dBm in case of RSRP.

Obn, Hys are expressed in dB.

Thresh1 is expressed in the same unit as Ms.

Thresh2 is expressed in the same unit as Mn.

The measurement report has the purpose to transfer the L1 measurement results from the UE 400' to the wireless communication system or network. RRC controls the event triggered L1 beam level measurement reporting by configuring the following parameter(s):

reportInterval: the periodicity of the event-triggered periodic measurement report;

reportAmount: number of measurement reports needs to be transmitted after the event is triggered;

maxNumberOfReportedBeams: number of beams whose measurements can be reported in the event triggered L1 measurement report by MAC CE regardless whether or
not the report includes the current beam;

allowReportAnyBeam: whether the UE can report the
measurement results for the beams not satisfying the
conditions of the events;

reportCurrentBeam: whether the UE is required to report
the measurement result of the current beam;

Itm-CandidateReportConfigId: LTM candidate cell ID for
which the UE is required to measure reference signal
and perform LTM event evaluation;

candidateSpecificOffset: offset for event condition that is
applicable for all the reference signals belonging to the
candidate cell with the candidate cell ID Itm-Candida-
teReportConfigId;

candidateSpecificOffsetS: offset for event condition that
is applicable for all the reference signals belonging to
the serving cell with the candidate cell ID Itm-Candi-
dateReportConfigId;

reportQuantity: the report quantity for the CSI report.

For the event triggered L1 measurement reporting, for
each Itm-CSI-ReportConfigId included in the LTM-CSI-
ReportConfig, the MAC entity shall:

1> if at least one L1 measurement report has been
triggered as described below and not cancelled:
2> if UL-SCH resources are available for a new trans-
mission in the serving cell and these UL-SCH
resources can accommodate the L1 measurement
report MAC CE plus its subheader as a result of
logical channel prioritization:
3> instruct the Multiplexing and Assembly proce-
dure to generate the L1 measurement report MAC
CE associated with the Itm-CSI-ReportConfig/d
according to the measurement report information
in the MR_LIST;
3> if reportAmount is configured in the LTM-Event-
TriggeredPeriodicReport by RRC:
4> if at least one L1 measurement report associ-
ated with the Itm-CSI-ReportConfig/d has been
triggered due to the reason other than the expiry
of the periodical reporting timer and the L1
measurement report is not cancelled:
5> set the MR_SENT_COUNTER to 0 for this
Itm-CSI-ReportConfigId;
4> increment the MR_SENT_COUNTER associ-
ated with the Itm-CSI-ReportConfig/d by 1;
4> stop the periodical reporting timer, if running;
4> if reportAmount is configured in RRC, and the
MR_SENT_COUNTER as defined for this Itm-
CSI-ReportConfigId is less than reportAmount:
5> restart the periodical reporting timer with the
value of reportInterval for this Itm-CSI-Report-
ConfigId as defined within the corresponding
LTM-CSI-reportConfig;
3> include the SSBRI or CRI in the BEAM_ENT-
ERING_LIST for this Itm-CSI-ReportConfigId, if
any, into the BEAM_REPORTED_LIST for this
Itm-CSI-ReportConfigId;
3> clear the BEAM_ENTERING_LIST for this Itm-
CSI-ReportConfigId;
3> clear the BEAM_LEAVING_LIST for this Itm-
CSI-ReportConfigId;
3> if the BEAM_REPORTED_LIST for this Itm-
CSI-ReportConfigId is empty:
4> remove the measurement reporting entry
within the MR_LIST for this Itm-CSI-Report-
ConfigId;

4> stop the periodical reporting timer for this
Itm-CSI-ReportConfigId, if running;
3> cancel the triggered L1 measurement report;
2> else if the UL-SCH resources are available for a new
transmission in the serving cell and these UL-SCH
resources can accommodate the Truncated L1 mea-
surement report MAC CE plus its subheader as a
result of logical channel prioritization:
3> instruct the Multiplexing and Assembly proce-
dure to generate the Truncated L1 measurement
report MAC CE associated with the Itm-CSI-
ReportConfigId according to the measurement
report information in the MR_LIST be selecting
the RS(s) based on a decreasing order of the
priority for the type of beam: RS(s) in BEA-
M_ENTERING_LIST, RS(s) in BEAM_LEAV-
ING_LIST, RS(s) in BEAM_REPORTED_LIST,
and other RS(s) not in these three lists;
2> else:
3> if the dedicated SR configuration for L1 mea-
surement report MAC CE transmission is config-
ured:
4> trigger the SR using the dedicated SR configu-
ration for L1 measurement report;
3> else:
4> initiate a Random Access procedure on the
SpCell and cancel the pending SR trigger,
3> stop the periodical reporting timer for this Itm-
CSI-ReportConfigId, if running.

NOTE: After sending a Truncated L1 measurement report
MAC CE, if the subsequent UL grant is still not big enough
to fit all the remaining beams, it is up to UE implementation
to select the beam(s) which were not included in the previ-
ous MAC CE.

NOTE: If more than one triggering events for L1 mea-
surement report are pending and the UL grant is not suffi-
cient for all regular L1 measurement report MAC CEs, it is
up to UE implementation how to handle/include the L1
measurement report MAC CEs and/or Truncated L1 mea-
surement report MAC CE.

NOTE: When a measurement report is triggered by entry
condition for one or more RS(s), and included in the
BEAM_ENTERING_LIST, another measurement report is
triggered by exit condition for the same RS(s), all the
corresponding measurement reports are cancelled. When a
measurement report is triggered by exit condition for one or
more RS(s), and included in the BEAM_ENTERING_LIST,
another measurement report is triggered by entry condition
for the same RS(s), all the corresponding measurement
reports are cancelled.

Thus, in accordance with the above embodiment, the UE
400' of FIG. 5, which is configured or preconfigured to
monitor a plurality of beams for a predefined time period for
one or more predefined event criteria, may further determine a meeting of the one or more predefined event
criteria using a Layer1 measurement, the one or more
of the predefined event criteria comprising one or more
of the following: LTM2, LTM3, LTM4, LTM5, responsive to meeting one or more of the predefined event
criteria, perform one or more configured or preconfig-
ured actions, the one or more configured or preconfig-
ured actions comprise providing a measurement report,
and send the measurement report to a wireless communication
system or network entity of the wireless communica-
tion system or network in case a leaving condition is
met, the measurement report comprising a channel state information reference signal (CSI-RS) resource indicator (CRI) and/or a SS/PBCH Block Resource Indicator (SSBRI).

In accordance with further embodiments, for the Layer1 measurement, the UE obtains L1 beam level measurement results by measuring one or multiple reference signals (RSs) as configured by the wireless communication system or network.

In accordance with further embodiments, the UE obtains the L1 beam level measurement results by measuring the one or multiple RSs for one or more LTM candidate cells. The plurality of beams may include beams form a serving cell and/or from one or more candidate cells, and the plurality of beams may include the one or multiple reference signals (RSs) to be measured by the UE for obtaining the L1 beam level measurement results. The measurement report may be used for indicating to a serving cell or gNB the L1 measurement results from a serving cell and/or one or more candidate cells.

In accordance with further embodiments, the UE is configured by the wireless communication system or network to report the following measurement information based on SS/PBCH block(s): measurement results per SS/PBCH block; SS/PBCH block(s) resource indicator (SSBRI), and/or report the following measurement information based on CSI-RS resources: measurement results per CSI-RS resource; CSI-RS resource indicator (CRI).

In accordance with further embodiments, the predefined time period comprises a time-to-trigger (TTT), the measurement report comprises an event triggered L1 measurement report, and events for the event-triggered measurement report comprise one or more of the following: LTM2, LTM3, LTM4, LTM5. The TTT may be a time during which the leaving condition needs to be consistently satisfied for sending or reporting the event triggered L1 measurement report.

The event LTM2 is a beam of serving cell becoming worse than a threshold, and the leaving condition for the event LTM2 is satisfied when Ms−Hys>Thresh, with Ms a beam measurement quantity of the serving cell based on SS/PBCH block or CSI-RS, Hys a hysteresis parameter for the event LTM2, Thresh a threshold parameter for the event LTM2.

Ms is expressed in dBm in case of RSRP, Hys is expressed in dB, and Thresh is expressed in the same unit as Ms.

The event LTM3 is a beam of a candidate cell becoming offset better than a beam of a serving cell, and the leaving condition for the event LTM3 is satisfied when Mn+Obn+Hys<Ms+Obs+Off, with Mn beam measurement quantity of the LTM candidate cell based on SS/PBCH block or CSI-RS, Obn offset of the LTM candidate cell Ms a beam measurement quantity of the serving cell based on SS/PBCH block or CSI-RS, Obs offset of the beam of the serving cell, Hys a hysteresis parameter for the event LTM3, Off offset parameter for the event LTM3.

Mn, Ms are expressed in dBm in case of RSRP, and Obn, Obs, Hys, Off are expressed in dB.

The event LTM4 is a beam of a candidate cell becoming better than an absolute threshold, and the leaving condition for the event LTM4 is satisfied when Mn+Obn+Hys<Thresh with Mn beam measurement quantity of the LTM candidate cell based on SS/PBCH block or CSI-RS, Obn offset of the LTM candidate cell Hys a hysteresis parameter for the event LTM4, Thresh a threshold parameter for the event LTM4.

Mn is expressed in dBm in case of RSRP, Obn, Hys are expressed in dB, and Thresh is expressed in the same unit as Mn.

The event LTM5 is a beam of a serving cell becoming worse than a first (threshold1) and a beam of a candidate cell becoming better than a second threshold (threshold2), and the leaving condition for the event LTM5 is satisfied when Ms−Hys>Thresh1, and/or Mn+Obn+Hys<Thresh2, with Ms a beam measurement quantity of the serving cell based on SS/PBCH block or CSI-RS, Mn beam measurement quantity of the LTM candidate cell based on SS/PBCH block or CSI-RS, Obn offset of the LTM candidate cell, Hys a hysteresis parameter for the event LTM5, Thresh1 a threshold parameter for the event LTM5, Thresh2 a threshold parameter for the event LTM5, Mn, MS are expressed in dBm in case of RSRP, Obn, Hys are expressed in dB, Thresh1 is expressed in the same unit as Ms, and Thresh2 is expressed in the same unit as Mn.

In accordance with embodiments, the UE 400' may be is configured or preconfigured with one or more conditions for an early termination of the monitoring prior to an end of the predefined time period, and/or one or more exceptional conditions causing the UE to not perform the early termination. The UE 400' dependent on the condition(s)/exceptional condition(s) may terminate a TTT period early or extend the TTT period. When one or more of the exceptional conditions are met, the UE 400' does is not to perform the early termination, rather the predefined time period is extended in accordance with one or more configured or preconfigured values. Stated differently, the UE 400' is configured or preconfigured to monitor, as is indicated at 412, a plurality of beams for a predefined time period, like a TTT period, for one or more predefined event criteria. The UE 400' may further be configured or preconfigured with the one or more conditions and/or exceptional conditions 414 for terminating/extending the monitoring 412 prior to/beyond an end of the predetermined time period. One of the of the plurality of beams is a primary beam associated with a connected or serving cell and another one of the plurality of beams is a secondary beam associated with a cell neighboring the connected or serving cell.

The network entity or base station 500' serves one or more of a plurality of user devices, UEs, of the wireless communication system, for example UE 400'. The network entity 500' configures the UE 400' to monitor 412 a plurality of beams for a predefined time period for one or more predefined event criteria. Further, the network entity 500' may configure the UE 400' with one or more conditions and/or exceptional conditions 414 for terminating/extending the monitoring prior to/beyond an end of the predefined time period. The UE 400' and the network entity 500' include respective antennas 402' and 502' and communicates with each over a radio link 410'. The radio link 410' may be used by the base station 500' for sending the necessary data for configuring the UE 400'. The plurality of beams may be provided by one or more network entities of the wireless communication system, e.g., by one or more of the following:

one or more certain cells of the wireless communication system, one or more antenna ports, one or more antennas, a serving cell, a candidate cell,
a group of candidate cells,
a master cell group, MCG,
a secondary cell group, SCG,
a primary cell, PCell,
a secondary cell, SCell,
a transmission and reception point, TRP,
a special cell, SpCell, e.g., a serving primary cell of a
    MCG,
a core network, CN, entity, e.g., a network function.

The one or more predefined event criteria may be determined based on a Layer1 measurement and/or based on a Layer3 measurement. The predefined event criteria may include one or more of the following: A1, A2, A3, A4, A5, B1, B2, LTM2, LTM3, LTM4, LTM5. Responsive to one or more predefined event criteria being met, the UE is to perform one or more configured or preconfigured actions, like providing a measurement report such as a Layer1 measurement report or LTM, e.g., relating to one or more cell-based measurements or one or more beam-based measurements,
initiating and/or performing a handover procedure,
initiating and/or performing a conditional handover procedure.

The one or more conditions and the one or more exceptional conditions may comprise one or more of the following:

a maximum number of beams monitored,
a minimum time duration for a beam meeting the one or more predefined event criteria,
a remaining duration of the predefined time period,
measured signal parameters of the plurality of beams,
a change of measured beams,
a change of a primary beam, e.g. the current beam from the connected cell,
a change of a secondary beam, e.g. the best beam of the neighboring cell changes,
a type of reference signal with which the plurality of beams are configured, a change of one or more neighboring cells.

In accordance with embodiments, the network entity 500' serves one or more of a plurality of cells, e.g., in case the network entity 500' is a distributed unit, DU, or a central unit, CU, of an IAB node. In accordance with embodiments, the network entity 500' configures the one or more reset conditions differently for each UE or for each of one or more groups of UEs, and/or
for each LTM event or for each of one or more groups of LTM events, and/or
for each cell or each of one or more groups of cells.

Embodiments of the second aspect of the invention configure the UE 400' for an early termination or a reset of a predefined time period, i.e., prior to the end of the time period. Embodiments provide one or more TTT reset exception conditions.

Figure 6:
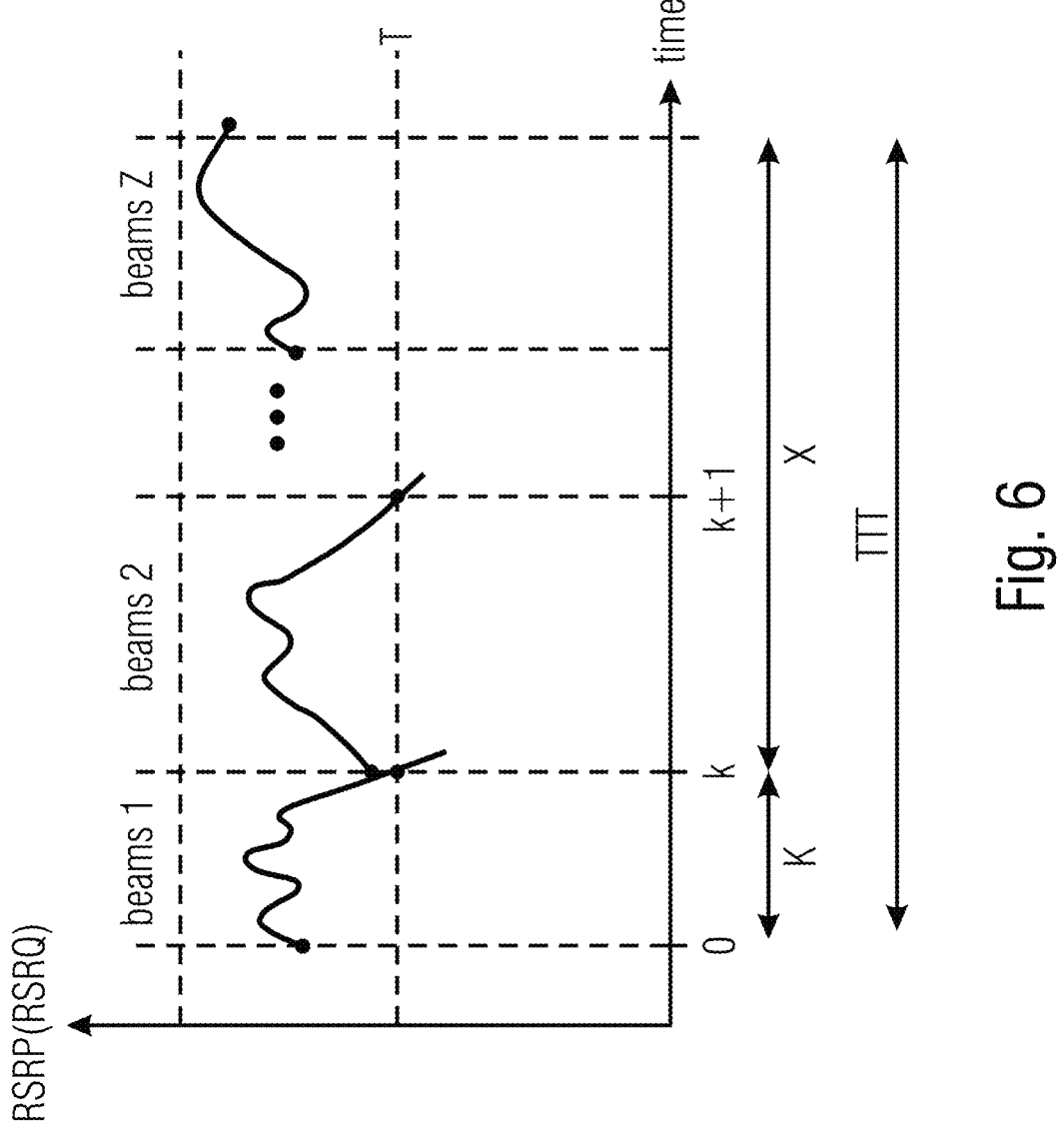
FIG. 6 illustrates a monitoring of a plurality of during a TTT period in accordance with embodiments of the second aspect of the present invention.

In accordance with embodiments, one of the TTT reset exception conditions may be a maximum number of beams evaluated during one TTT period or duration. FIG. 6 illustrates the monitoring of beams 1 to Z by the UE 400' during a TTT period. For instance, one beam, like beam 1 in FIG. 6, may begin to satisfy an event condition between a time 0 and k. Subsequently, a new beam, beam 2, may also meet the event condition between a time k and k+1. The UE 400' may be configured with an exception condition 414 causing the TTT period to be terminated responsive to reaching a maximum number of evaluated beams in the TTT duration, for example m beams with m being greater than or equal to one. If the number of evaluated or monitored beams in the single TTT period exceeds a preconfigured threshold, the UE 400' resets the TTT period. The UE 400' may then report this to the gNB 500'.

In accordance with another embodiment of the second aspect of the present invention, the TTT reset exception condition 414 may be linked to a certain time duration. For example, a minimum time duration may be established during which a beam needs to meet an event condition. The minimum time duration may be defined using a configured or preconfigured threshold value. For example, if one or more event conditions are not satisfied by a evaluated or monitored beam during a minimum time duration the UE may reset the TTT period. For example, when considering FIG. 6, it may be entailed that a monitored beam stays above a certain threshold T for more than the predefined minimum time. For example, the beams may be monitored by measuring reference signals on the beams, for example in a way as described above with regard to the first aspect of the present invention, and the respective beams are evaluated using the measured parameters, like RSRP or RSRQ. For example, the minimum required time duration may be K so that, in accordance with the embodiments depicted in FIG. 6, the UE 400' may reset the TTT period at time k as beam 1 stayed above the threshold T for the minimum required time K. In a situation in which the measurement values for beam 1 drop below the threshold T prior the time k, no reset of the TTT duration is performed by the UE 400'.

In accordance with yet another embodiment, the exception condition 414 may include a remaining time to complete the TTT duration. For example, dependent on the TTT duration minus K, which represents a current time, may decide on whether the TTT is to be reset or not. For example, when a remaining time of the TTT is large enough so it is likely that the monitoring of further beams during this additional time has an effect on whether the one or more criteria are met or not, the TTT may not be reset. However, if the remaining time X is below a threshold, for example below a time during a which a number of monitored beams is low so that a current state with regard to the one or more predefined criteria is less likely to be modified responsive to monitoring the additional low number of beams, the TTT period may be reset or terminated before its actual end. Thus, UE may to terminate the monitoring prior to the end of the predefined time period if a remaining time to complete the predefined period TTT is above or below a configured or preconfigured threshold, e.g., after a monitored beam indicator, like CRI or SSBRI or SSB index or CSI-RS ID, changes prior to the end of the predefined time period.

In accordance with yet another embodiment, the condition 414 may involve a comparison of average signal quality values of the respective beams, like the RSRP, e.g., L1-RSRP, and the RSRQ indicated in FIG. 6. For example, if the RSRP of beam 2 from a candidate cell during the timing device k to k+1 is lower than the RSRP of beam 1 from the same candidate cell during the time from 0 to k, the UE 400' may select to reset the TTT period as it may be determined that given the difference in the average signal qualities between the beams, the first beam is the better on of the candidate cell and, may therefore may be used so that it is necessary to continue with the TTT time period. This approach may be further enhanced by incorporating additional exceptions for a high and/or lowest quality difference of the absolute RSRP values of the beams or average RSRP differential value between the beams. The signal quality values may also be one or more of the following:

a signal to noise ratio, SNR, a signal to noise and interference ratio, SINR, e.g., L1-SINR, an interference level, e.g., interference power, a reference signal strength indicator, RSSI, a channel condition, e.g., a channel condition number, a rank indication, e.g., a rank indicator, RI, a preferred matrix index, PMI, a beamforming quality indicator, BFI, e.g., providing information about the quality of the beamforming used in transmission using more than one antenna, a channel quality indicator, CQI, delay and/or doppler parameters.

In accordance with yet other embodiments, a TTT reset exception may also be linked to a type of reference signals being used for monitoring the beams in FIG. 6. For example, a currently assessed beam from a serving cell may be configured with a different reference signal than a beam from the same cell which has been evaluated previously. In such a situation, and in case the UE 400 is not configured to operate in accordance with the first aspect of the present application allowing for the evaluation of different reference types, since the monitoring of the currently assessed beam does not yield any results on the basis of which a decision can be taken, the UE 400' may terminate the TTT period responsive to determining that a subsequent beam is configured with a reference signal of a different type when compared to a previous beam. This also applies when evaluating respective beams from different cells, like from a serving cell and from a candidate cell. Unless the UE, as mentioned above, is configured to operate in accordance with the first aspect of the present invention, responsive to receiving a later beam, with a reference signal type different from an earlier beam from either the candidate cell or from the serving cell, the UE may terminate the TTT period and, thereby, terminate the monitoring of the later beam from the serving cell or from the candidate cell.

In accordance with embodiments, the TTT reset exceptions may be customized for each candidate cell and/or each configuration. The exceptions can be applied to both the current beam or serving beam of a serving cell and the candidate beam of a candidate cell or candidate cell group. By customizing the TTT reset exceptions, the wireless communication system can benefit from both high robustness and short interruption times, improving overall performance and reliability.

In accordance with embodiments, one of the reasons for the customization between cells may be that they may operate on different frequencies. When cells are on different frequencies, they are considered inter-frequency neighbors. This means that a user equipment (UE) transitioning from one cell to another may need to switch frequencies, which can involve more complex handover procedures compared to intra-frequency handovers where the cells operate on the same frequency. Customizing the Time-to-Trigger (TTT) reset exceptions for each candidate cell based on their operating frequencies can optimize the handover process, by ensuring that the system can handle the unique characteristics and challenges associated with different frequency bands.

In a further embodiment, the cell load can be taken into account, steering a user equipment (UE) to less crowded cells. This approach can help balance the network load and improve overall system performance. By considering the cell load, the network can dynamically allocate resources and direct UEs to cells with lower traffic, ensuring a more efficient use of available resources and reducing congestion in heavily loaded cells.

FIG. 7 illustrates an embodiment of a conditional handover LTM configuration. The configuration basically corresponds to a configuration as defined, e.g., in TS 138 331 v18.1.0, which includes, in addition, the parameter condExecutionCond-LTM for configuring the UE 400' with the one or more conditions. The execution condition needs to be fulfilled in order to trigger the execution of a conditional reconfiguration.

In a further embodiment, the network pre-configures the UE with a set of target cells and the condExecutionCond-LTM conditions under which the handover should occur. These conditions may include criteria such as signal strength thresholds, quality measurements, or other network parameters. When the UE detects that the execution conditions are met, it triggers the handover to the target cell without requiring additional signaling exchanges with the source cell.

The condExecutionCond-LTM may be used for LTM conditional handover scenarios where the UE is configured to monitor specific criteria. If the one or more condExecutionCond-LTM are met, the UE may initiate a handover, reducing reporting overhead and/or handover latency and improving the robustness of the wireless communication system.

In accordance with embodiments, responsive to terminating/extending the predefined time period, the UE may to send a report to a network entity of the wireless communication system. The report may indicate whether or not the one or more predefined event criteria are met. The UE may send a report also to a network entity of the wireless communication system if one or more event criteria are not met. The UE may send the report to a network entity of the wireless communication system in case of one or more of the following:

the predefined time period ends, one or more exceptions occur, a primary beam changes, a secondary beam changes, a secondary cell changes, a leaving condition is met The report may comprise one of mor of the following:

a beam ID, a cell ID, e.g., secondary cell IDs a configuration ID, an indication of the monitored beams, a CRI, a SSBRI, a SSB index, a CSI-RS ID, a number of monitored beams, one or more or all primary beams, one or more or all secondary beams, one or more or all secondary cells, a last primary beam monitored, a last secondary beam monitored.

Responsive to sending the report indicating that the one or more predefined event criteria are met, the UE may to receive from the network entity an indication to perform one or more operations, e.g., a handover to a target cell.

In accordance with other embodiments, responsive to determining that the one or more predefined event criteria are met, the UE may perform one or more operations, e.g., a handover to a target cell, and/or responsive to determining that the one or more predefined event criteria are not met, the UE does not to perform one or more operations, e.g., a handover to a target cell.

General

Embodiments of the present invention have been described in detail above, and the respective embodiments and aspects may be implemented individually or two or more of the embodiments or aspects may be implemented in combination.

In accordance with embodiments, the wireless communication system may include a terrestrial network, or a non-terrestrial network, or networks or segments of networks using as a receiver an airborne vehicle or a space-borne vehicle, or a combination thereof. Further, the wireless communication system may by a system or network different from the above described 4G or 5G mobile communication systems, rather, embodiments of the inventive approach may also be implemented in any other wireless communication network, e.g., in a private network, such as an Intranet or any other type of campus networks, or in a WiFi communication system.

In accordance with embodiments of the present invention, a user device comprises one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and entailing input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or a Wi-Fi device, like a station (STA), access point (AP), node or mesh node, or mesh point, or Mesh AP, or any sidelink capable network entity.

In accordance with embodiments of the present invention, a network entity comprises one or more of the following: a macro cell base station, or a small cell base station, or a central unit of a base station, an integrated access and backhaul, IAB, node, or a distributed unit of a base station, or a road side unit (RSU), or a Wi-Fi device such as an access point (AP) or mesh node (Mesh AP), or a remote radio head, or an AMF, or a MME, or a SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear, that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 8:
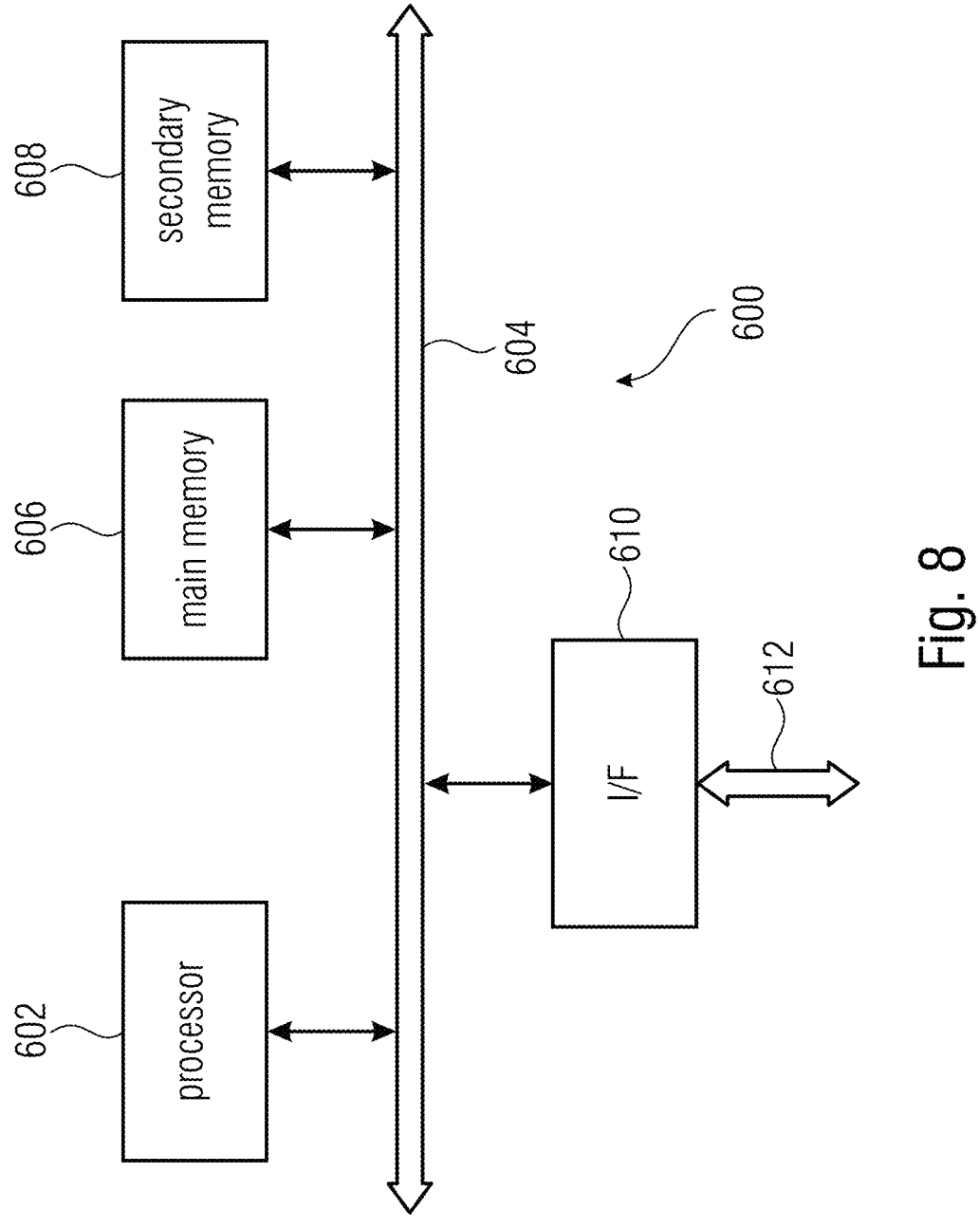
FIG. 8 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 8 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A user device, UE, for a wireless communication system or network, wherein the UE is configured or preconfigured to monitor a plurality of beams for a predefined time period for one or more predefined event criteria, wherein the UE is to determine a meeting of the one or more predefined event criteria using a Layer1 measurement, the one or more of the predefined event criteria comprising one or more of the following: LTM2, LTM3, LTM4, LTM5, wherein, responsive to meeting one or more of the predefined event criteria during the predefined time period, the UE is to perform one or more configured or preconfigured actions, the one or more configured or preconfigured actions comprise providing a measurement report, wherein the UE is to send the measurement report to a network entity of the wireless communication system or network in case a leaving condition is met, the measurement report comprising a channel state information reference signal resource indicator and/or a SS/PBCH Block Resource Indicator, wherein the predefined time period comprises a time-to-trigger (TTT), the measurement report comprises an event triggered L1 measurement report, and events for the event-triggered measurement report comprise one or more of the following: LTM2, LTM3, LTM4, LTM5, and wherein the event LTM4 is a beam of a candidate cell becoming better than an absolute threshold, and the leaving condition for the event LTM4 is satisfied when $$Mn + Obn + Hys < Thresh$$

with

Mn beam measurement quantity of the LTM candidate cell based on SS/PBCH block or CSI-RS, Obn offset of the LTM candidate cell Hys a hysteresis parameter for the event LTM4, Thresh a threshold parameter for the event LTM4, wherein Mn is expressed in dBm in case of RSRP, Obn, Hys are expressed in dB, and Thresh is expressed in the same unit as Mn.

2. The user device, UE, of claim 1, wherein, for the Layer1 measurement, the UE acquires L1 beam level measurement results by measuring one or multiple reference signals (RSs) as configured by the wireless communication system or network.

3. The user device, UE, of claim 2, wherein the UE acquires the L1 beam level measurement results by measuring the one or multiple RSs for one or more LTM candidate cells.

4. The user device, UE, of claim 2, wherein the plurality of beams comprises beams from a serving cell and/or from one or more candidate cells, the plurality of beams comprising the one or multiple reference signals to be measured by the UE for acquiring the L1 beam level measurement results.

5. The user device, UE, of claim 2, wherein the measurement report is used for indicating to a serving cell or gNB the L1 measurement results from a serving cell and/or one or more candidate cells.

6. The user device, UE, of claim 1, wherein the UE is configured by the wireless communication system or network to report the following measurement information based on SS/PBCH block(s): measurement results per SS/PBCH block; SS/PBCH block(s) resource indicator, and/or the UE is configured by the wireless communication system or network to report the following measurement information based on CSI-RS resources: measurement results per CSI-RS resource; CSI-RS resource indicator.

7. The user device, UE, of claim 1, wherein the TTT is a time during which the leaving condition needs to be consistently satisfied for sending or reporting the event triggered L1 measurement report.

8. The user device, UE, of claim 1, wherein the UE is configured or preconfigured with the one or more events using an LTM-CSI-ResourceConfig, an LTM-CSI-SSB-ResourceSet, an LTM-Candidate and/or a LTM-SSB-Config.

9. The user device, UE, of claim 1, wherein the event LTM2 is a beam of serving cell becoming worse than a threshold, and the leaving condition for the event LTM2 is satisfied when $$Ms - Hys > Thresh,$$

with

Ms a beam measurement quantity of the serving cell based on SS/PBCH block or CSI-RS, Hys a hysteresis parameter for the event LTM2, Thresh a threshold parameter for the event LTM2, wherein Ms is expressed in dBm in case of RSRP, Hys is expressed in dB, and Thresh is expressed in the same unit as Ms.

10. The user device, UE, of claim 1, wherein the event LTM3 is a beam of a candidate cell becoming offset better than a beam of a serving cell, and the leaving condition for the event LTM3 is satisfied when $$Mn + Obn + Hys < Ms + Obs + Off,$$

with

Mn beam measurement quantity of the LTM candidate cell based on SS/PBCH block or CSI-RS, Obn offset of the LTM candidate cell Ms a beam measurement quantity of the serving cell based on SS/PBCH block or CSI-RS, Obs offset of the beam of the serving cell, Hys a hysteresis parameter for the event LTM3, Off offset parameter for the event LTM3, wherein Mn, Ms are expressed in dBm in case of RSRP, and Obn, Obs, Hys, Off are expressed in dB.

11. The user device, UE, of claim 1, wherein the event LTM5 is a beam of a serving cell becoming worse than a first (threshold1) and a beam of a candidate cell becoming better than a second threshold (threshold2), and the leaving condition for the event LTM5 is satisfied when $$Ms - Hys > Thresh1, \text{ and/or}$$

$$Mn + Obn + Hys < Thresh2$$

with

Ms a beam measurement quantity of the serving cell based on SS/PBCH block or CSI-RS, Mn beam measurement quantity of the LTM candidate cell based on SS/PBCH block or CSI-RS, Obn offset of the LTM candidate cell, Hys a hysteresis parameter for the event LTM5, Thresh1 a threshold parameter for the event LTM5, Thresh2 a threshold parameter for the event LTM5, wherein Mn, MS are expressed in dBm in case of RSRP, Obn, Hys are expressed in dB, Thresh1 is expressed in the same unit as Ms, and Thresh2 is expressed in the same unit as Mn.

12. The user device, UE, of claim 1, wherein the one or more configured or preconfigured actions further comprise one or more of the following:

initiating and/or performing a handover procedure, initiating and/or performing a conditional handover procedure.

13. The user device, UE, of claim 1, wherein the plurality of beams comprises a first beam and a second beam, the first beam of the plurality of beams associated with a serving cell and the second beam of the plurality of beams associated with a candidate cell or a cell neighboring the serving cell.

14. The user device, UE, of claim 1, wherein the plurality of beams are provided by one or more network entities of the wireless communication system or network, of the wireless communication system or network comprises one or more of the following: a serving cell, and/or a candidate cell.

15. The user device, UE, of claim 1, wherein, responsive to predefined time period, the UE is to send a report to a network entity of the wireless communication system or network, the report indicating whether or not the one or more predefined event criteria are met.

16. The user device, UE, of claim 1, wherein the measurement report further comprises one of more of the following:

a beam ID, a cell ID, a configuration ID, an indication of the monitored beams, a SSB index, a CSI-RS ID, a number of monitored beams, one or more or all primary beams, one or more or all secondary beams, one or more or all secondary cells, a last primary beam monitored, a last secondary beam monitored.

17. A network entity for a wireless communication system, wherein the network entity is to serve one or more of a plurality of user devices, UE, of the wireless communication system, the network entity is to configure a UE to monitor a plurality of beams for a predefined time period for one or more predefined event criteria, determine a meeting of the one or more predefined event criteria using a Layer1 measurement, the one or more of the predefined event criteria comprising one or more of the following: LTM2, LTM3, LTM4, LTM5, responsive to meeting one or more of the predefined event criteria during the predefined time period, perform one or more configured or preconfigured actions, the one or more configured or preconfigured actions comprise providing a measurement report, send the measurement report to the network entity in case a leaving condition is met, the measurement report comprising a channel state information reference signal resource indicator and/or a SS/PBCH Block Resource Indicator, wherein the predefined time period comprises a time-to-trigger (TTT), the measurement report comprises an event triggered L1 measurement report, and events for the event-triggered measurement report comprise one or more of the following: LTM2, LTM3, LTM4, LTM5, and wherein the event LTM4 is a beam of a candidate cell becoming better than an absolute threshold, and the leaving condition for the event LTM4 is satisfied when $$Mn + Obn + Hys < Thresh$$

with

Mn beam measurement quantity of the LTM candidate cell based on SS/PBCH block or CSI-RS, Obn offset of the LTM candidate cell Hys a hysteresis parameter for the event LTM4, Thresh a threshold parameter for the event LTM4, wherein Mn is expressed in dBm in case of RSRP, Obn, Hys are expressed in dB, and Thresh is expressed in the same unit as Mn.

18. A method for operating a user device, UE, for a wireless communication system or network, the method comprising:

monitoring a plurality of beams for a predefined time period for one or more predefined event criteria, determining a meeting of the one or more predefined event criteria using a Layer1 measurement, the one or more of the predefined event criteria comprising one or more of the following: LTM2, LTM3, LTM4, LTM5, performing, responsive to meeting one or more of the predefined event criteria during the predefined time period, one or more configured or preconfigured actions, the one or more configured or preconfigured actions comprise providing a measurement report, sending the measurement report to a network entity of the wireless communication system or network in case a leaving condition is met, the measurement report comprising a channel state information reference signal resource indicator and/or a SS/PBCH Block Resource Indicator, wherein the predefined time period comprises a time-to-trigger (TTT), the measurement report comprises an event triggered L1 measurement report, and events for the event-triggered measurement report comprise one or more of the following: LTM2, LTM3, LTM4, LTM5, and wherein the event LTM4 is a beam of a candidate cell becoming better than an absolute threshold, and the leaving condition for the event LTM4 is satisfied when $$Mn + Obn + Hys < Thresh$$

with
Mn beam measurement quantity of the LTM candidate cell based on SS/PBCH block or CSI-RS,
Obn offset of the LTM candidate cell
Hys a hysteresis parameter for the event LTM4,
Thresh a threshold parameter for the event LTM4,
wherein Mn is expressed in dBm in case of RSRP, Obn, Hys are expressed in dB, and Thresh is expressed in the same unit as Mn.

\* \* \* \* \*